United States Patent
Wang et al.

(10) Patent No.: US 11,917,582 B2
(45) Date of Patent: Feb. 27, 2024

(54) SIDELINK COVERAGE EXTENSION USING REPEATED TRANSMISSION

(71) Applicant: QUALCOMM Incorporated, San Diego, CA (US)

(72) Inventors: Hua Wang, Basking Ridge, NJ (US); Sony Akkarakaran, Poway, CA (US); Xiaojie Wang, Hillsborough, NJ (US); Tao Luo, San Diego, CA (US); Junyi Li, Franklin Park, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 127 days.

(21) Appl. No.: 17/231,531

(22) Filed: Apr. 15, 2021

(65) Prior Publication Data

US 2022/0338168 A1 Oct. 20, 2022

(51) Int. Cl.
*H04W 72/02* (2009.01)
*H04W 28/26* (2009.01)
*H04W 72/0446* (2023.01)
*H04W 72/20* (2023.01)

(52) U.S. Cl.
CPC ........... *H04W 72/02* (2013.01); *H04W 28/26* (2013.01); *H04W 72/0446* (2013.01); *H04W 72/20* (2023.01)

(58) Field of Classification Search
CPC . H04W 72/02; H04W 28/26; H04W 72/0406; H04W 72/0446
See application file for complete search history.

(56) References Cited

U.S. PATENT DOCUMENTS

2020/0029340 A1   1/2020  He et al.
2020/0336253 A1  10/2020  He et al.
2021/0176747 A1*  6/2021  Yang ................. H04W 72/0446
(Continued)

OTHER PUBLICATIONS

Fraunhofer HHI., et al., "Resource Allocation for Mode 2 NR V2X", 3GPP TSG RAN WG1 #99, R1-1912289, 3rd Generation Partnership Project, Mobile Competence Centre, 650, Route Des Lucioles, F-06921 Sophia-Antipolis Cedex, France, vol. RAN WG1, No. Reno, USA, Nov. 18, 2019-Nov. 22, 2019 Nov. 8, 2019, XP051819983, pp. 1-9.

(Continued)

*Primary Examiner* — Raj Jain
(74) *Attorney, Agent, or Firm* — Procopio, Cory, Hargreaves & Savitch LLP/QUALCOMM Incorporated

(57) ABSTRACT

This disclosure provides systems, devices, apparatus, and methods, including computer programs encoded on storage media, for a sidelink coverage extension using repeated transmission. A first UE may transmit a multiple slot SCI in a first slot of a group of multiple slots for reserving resources for the group of multiple slots and transmitting one or more sidelink transmissions in the reserved resources. A second UE may receive the multiple slot SCI in the first slot of the group of multiple slots for receiving the one or more sidelink transmissions in the reserved resources for the group of multiple slots. In aspects, a base station may receive configuration parameters for the multiple slot SCI and configure one or more UEs with a multiple slot configuration, based on the configuration parameters, for transmitting/receiving the multiple slot SCI associated with the reserved resources in the group of multiple slots.

62 Claims, 13 Drawing Sheets

(56) References Cited

U.S. PATENT DOCUMENTS

2022/0216956 A1* 7/2022 Yoshioka ................ H04L 1/189
2022/0312385 A1* 9/2022 Sun ....................... H04W 72/02
2022/0330278 A1* 10/2022 Hong .................... H04W 92/18

OTHER PUBLICATIONS

International Search Report and Written Opinion—PCT/US2022/020628—ISA/EPO—dated Jun. 8, 2022.
Mediatek Inc: "Discussion on Sidelink Physical Layer Structure", 3GPP TSG RAN WG1 #100bis, R1-2001846, 3rd Generation Partnership Project, Mobile Competence Centre, 650, Route Des Lucioles, F-06921 Sophia-Antipolis Cedex, France, vol. RAN WG1, No. e-Meeting, Apr. 20, 2020-Apr. 30, 2020 Apr. 11, 2020, XP051875313, pp. 1-11.

\* cited by examiner

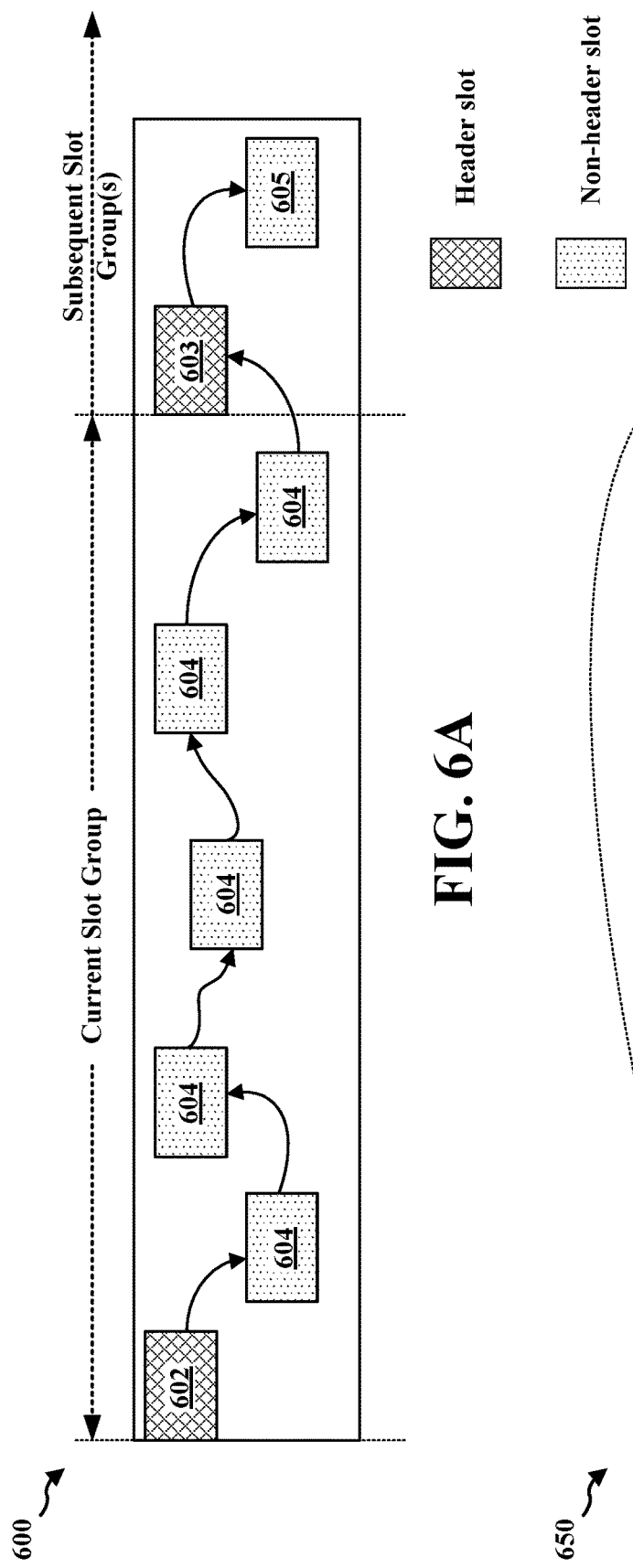
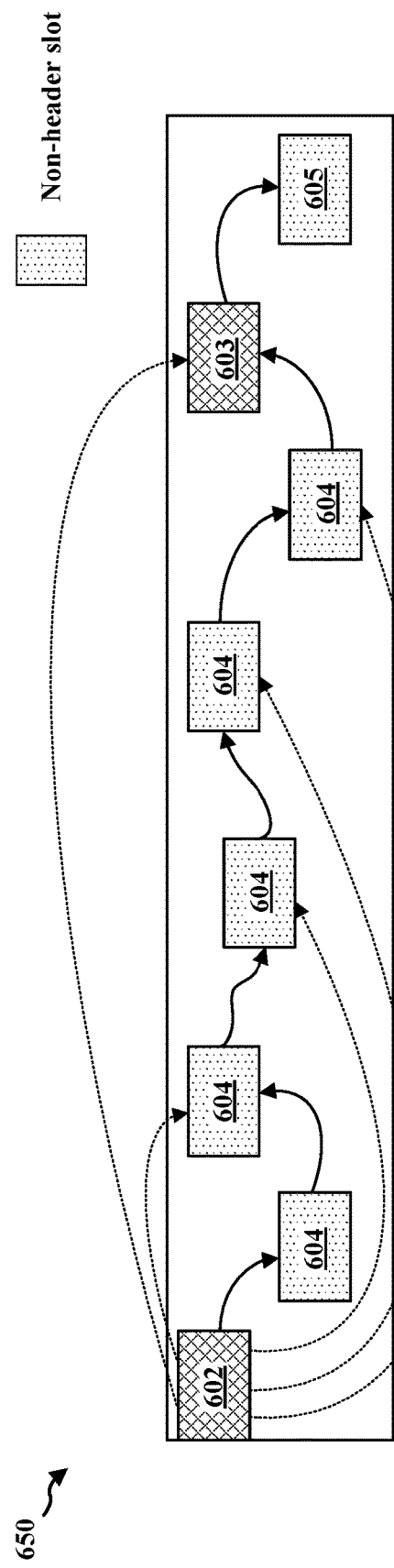
FIG. 6A
FIG. 6B

SIDELINK COVERAGE EXTENSION USING REPEATED TRANSMISSION

INTRODUCTION

The present disclosure relates generally to communication systems, and more particularly, to sidelink communication.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. Some aspects of wireless communication may comprise direct communication between devices based on sidelink. There exists a need for further improvements in sidelink technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method of wireless communication at a first user equipment (UE) is provided. The method includes transmitting a multiple slot sidelink control information (SCI) in a first slot of a group of multiple slots, the multiple slot SCI reserving resources for the group of multiple slots; and transmitting one or more sidelink transmissions in the reserved resources for the group of multiple slots.

In an aspect of the disclosure, an apparatus for wireless communication at a first UE is provided. The apparatus includes means for transmitting a multiple slot SCI in a first slot of a group of multiple slots, the multiple slot SCI reserving resources for the group of multiple slots; and means for transmitting one or more sidelink transmissions in the reserved resources for the group of multiple slots.

In an aspect of the disclosure, an apparatus for wireless communication at a first UE is provided. The apparatus includes memory and at least one processor coupled to the memory, the memory and the at least one processor configured to transmit a multiple slot SCI in a first slot of a group of multiple slots, the multiple slot SCI reserving resources for the group of multiple slots; and transmit one or more sidelink transmissions in the reserved resources for the group of multiple slots.

In an aspect of the disclosure, a non-transitory computer-readable storage medium, is provided. The apparatus is configured to transmit a multiple slot SCI in a first slot of a group of multiple slots, the multiple slot SCI reserving resources for the group of multiple slots; and transmit one or more sidelink transmissions in the reserved resources for the group of multiple slots.

In an aspect of the disclosure, a method of wireless communication at a second UE is provided. The method includes receiving a multiple slot SCI in a first slot of a group of multiple slots, the multiple slot SCI reserving resources for the group of multiple slots; and receiving one or more sidelink transmissions in the reserved resources for the group of multiple slots.

In an aspect of the disclosure, an apparatus for wireless communication at a second UE is provided. The apparatus includes means for receiving a multiple slot SCI in a first slot of a group of multiple slots, the multiple slot SCI reserving resources for the group of multiple slots; and means for receiving one or more sidelink transmissions in the reserved resources for the group of multiple slots.

In an aspect of the disclosure, an apparatus for wireless communication at a second UE is provided. The apparatus includes memory and at least one processor coupled to the memory, the memory and the at least one processor configured to receive a multiple slot SCI in a first slot of a group of multiple slots, the multiple slot SCI reserving resources for the group of multiple slots; and receive one or more sidelink transmissions in the reserved resources for the group of multiple slots.

In an aspect of the disclosure, a non-transitory computer-readable storage medium, is provided. The apparatus is configured to receive a multiple slot SCI in a first slot of a group of multiple slots, the multiple slot SCI reserving resources for the group of multiple slots; and receive one or more sidelink transmissions in the reserved resources for the group of multiple slots.

In an aspect of the disclosure, a method of wireless communication at a base station is provided. The method includes receiving configuration parameters for multiple slot SCI communicated between one or more UEs, the configuration parameters indicative of at least one of a starting location of a group of multiple slots or a number of slots included in the group of multiple slots; and configuring, based on the configuration parameters, the one or more UEs with a multiple slot configuration for transmitting the multiple slot SCI to reserve resources in the group of multiple slots.

In an aspect of the disclosure, an apparatus for wireless communication at a base station is provided. The apparatus includes means for receiving configuration parameters for multiple slot SCI communicated between one or more UEs, the configuration parameters indicative of at least one of a starting location of a group of multiple slots or a number of slots included in the group of multiple slots; and means for configuring, based on the configuration parameters, the one or more UEs with a multiple slot configuration for transmitting the multiple slot SCI to reserve resources in the group of multiple slots.

In an aspect of the disclosure, an apparatus for wireless communication at a base station is provided. The apparatus includes memory and at least one processor coupled to the memory, the memory and the at least one processor configured to receive configuration parameters for multiple slot SCI communicated between one or more UEs, the configuration parameters indicative of at least one of a starting location of a group of multiple slots or a number of slots included in the group of multiple slots; and configure, based on the configuration parameters, the one or more UEs with a multiple slot configuration for transmitting the multiple slot SCI to reserve resources in the group of multiple slots.

In an aspect of the disclosure, a non-transitory computer-readable storage medium, is provided. The apparatus is configured to receive configuration parameters for multiple slot SCI communicated between one or more UEs, the configuration parameters indicative of at least one of a starting location of a group of multiple slots or a number of slots included in the group of multiple slots; and configure, based on the configuration parameters, the one or more UEs with a multiple slot configuration for transmitting the multiple slot SCI to reserve resources in the group of multiple slots.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 6A-6B illustrate diagrams of resource reservation techniques.

DETAILED DESCRIPTION

Figure 1:
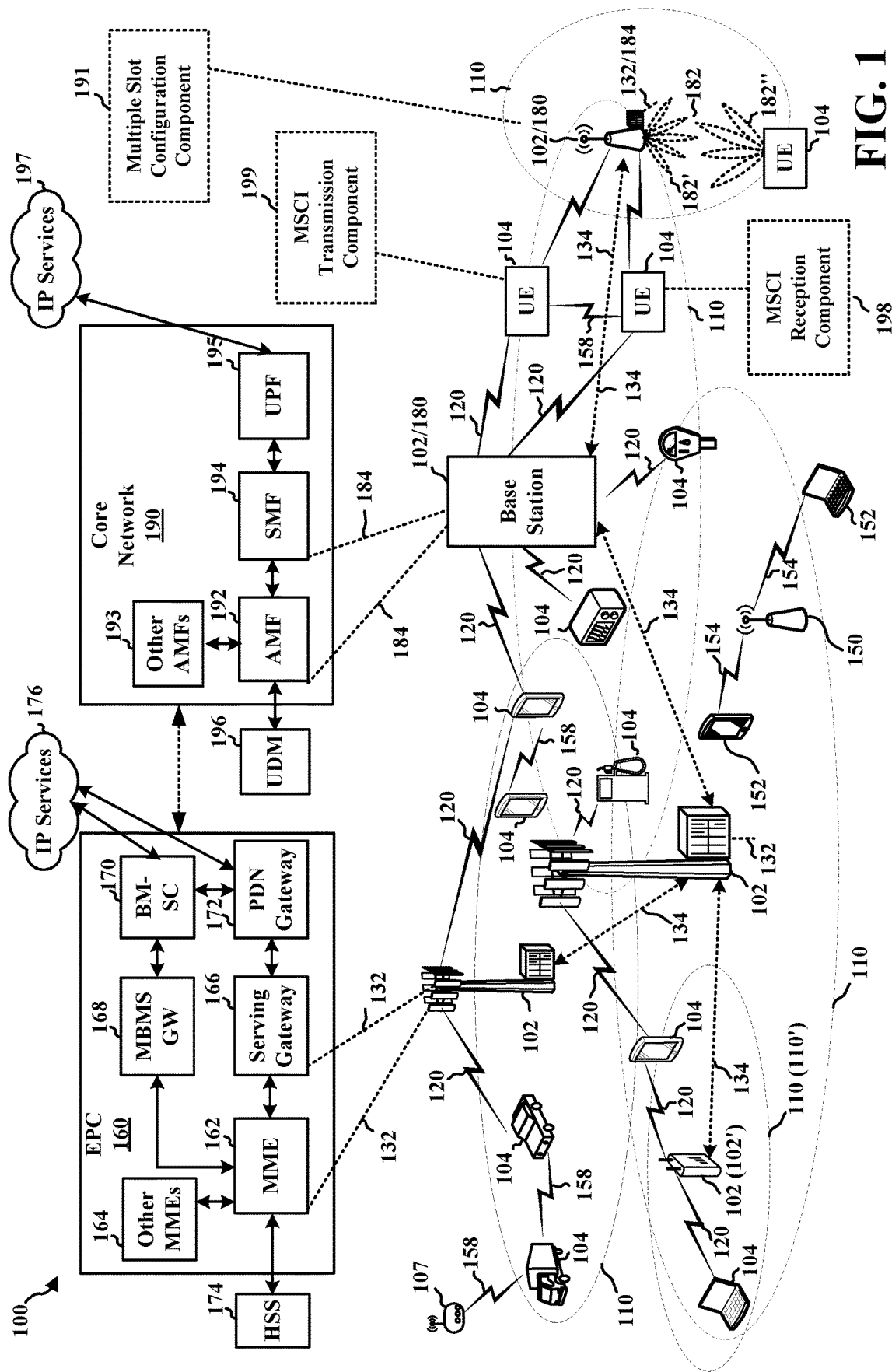
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more examples, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

A first user equipment (UE) may communicate via sidelink communications with a second UE that is located within a communication range of the first UE. A reliability/range of such sidelink communications may be impacted in some cases based on signal-to-noise ratio (SNR) losses (e.g., due to blockages), UE rotation (e.g., particularly in millimeter wave (mmW) communications), deep-indoor penetration losses, etc. According to one example, resource reservation may be based on each transmission including first stage sidelink control information (SCI-1) that points to a next reserved repetition resource, or in some cases a next two reserved repetition resources. Accordingly, such resource reservation may be limited to a maximum of 3 transmissions/retransmissions (e.g., when the transmission of the SCI-1 points to a next two repetition resources). Nevertheless, the reliability/range of the sidelink communications may be improved by increasing a number of repeated sidelink transmissions, e.g., to more than 3 repeated transmissions, for each resource reservation. In order to increase the number of repeated sidelink transmissions, e.g., to more than 3 repeated transmissions, which may improve the reliability at a receiver UE for decoding the sidelink transmissions, a physical sidelink control channel (PSCCH) and a physical sidelink shared channel (PSSCH) may be transmitted in a same slot. However, if control information is included in each slot of a sidelink frame, and the transmissions are repeated (e.g., more than 3 times), the control channel may have a high overhead.

Accordingly, the first UE may transmit multiple-slot sidelink control information (MSCI) configured to reserve more resources at one time than may be reserved by single slot sidelink control information (SCI), such as SCI-1 and second stage SCI (SCI-2). A UE that relies on SCI-1 pointing to a next reserved repetition resource may not be configured to decode MSCI. Thus, such UEs may perform successive reservations to reserve resources in consecutive slots.

The MSCI may be associated with a frame structure that includes a group of multiple slots comprising a first slot, which may be referred to as a header slot, for the MSCI, and one or more additional slots, which may be referred to as non-header slots, that do not include the MSCI. The MSCI included in the first slot of the group of multiple slots may be used to reserve resources for some or all of the remaining slots in the group of multiple slots.

In some aspects, the group of multiple slots may be referred to as a "super-slot" indicating that it is based on a structure comprising a set of multiple slots. In some aspects, the MSCI may be transmitted once per group of multiple slots. The term "header slot" may be used to refer to the slot that includes the MSCI. In other aspects, the slot including the MSCI may be referred to by a different name. Aspects presented herein provide for more efficient control signaling for sidelink resources by providing control information for the group of multiple slots in the header slot, which may be utilized for reserving resources for all of the one or more additional slots included in the group of multiple slots at the same time. An increased amount of resources may be allocated to control information in the first slot/header slot based on the MSCI to increase transmission repetition efficiencies associated with the control information in the one or more additional slots. The MSCI may also be used to reserve resources in one or more subsequent slots (e.g., subsequent header slots) of one or more subsequent groups of multiple slots.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

A link between a UE 104 and a base station 102 or 180 may be established as an access link, e.g., using a Uu interface. Other communication may be exchanged between wireless devices based on sidelink. For example, some UEs 104 may communicate with each other directly using a device-to-device (D2D) communication link 158. In some examples, the D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a PSSCH, and a PSCCH. D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

Some examples of sidelink communication may include vehicle-based communication devices that can communicate from vehicle-to-vehicle (V2V), vehicle-to-infrastructure (V2I) (e.g., from the vehicle-based communication device to road infrastructure nodes such as a Road Side Unit (RSU)), vehicle-to-network (V2N) (e.g., from the vehicle-based communication device to one or more network nodes, such as a base station), vehicle-to-pedestrian (V2P), cellular vehicle-to-everything (C-V2X), and/or a combination thereof and/or with other devices, which can be collectively referred to as vehicle-to-anything (V2X) communications. Sidelink communication may be based on V2X or other D2D communication, such as Proximity Services (ProSe), etc. In addition to UEs, sidelink communication may also be transmitted and received by other transmitting and receiving devices, such as Road Side Unit (RSU) 107, etc. Sidelink communication may be exchanged using a PC5 interface, such as described in connection with the example in FIG. 2. Although the following description, including the example slot structure of FIG. 2, may provide examples for sidelink communication in connection with 5G NR, the concepts described herein may be applicable to other similar areas, such as LTE, LTE-A, CDMA, GSM, and other wireless technologies.

Referring again to FIG. 1, in certain aspects, a UE 104, or other device communicating based on sidelink, such as a first UE, may include a MSCI transmission component 199 configured to transmit a multiple slot SCI in a first slot of a group of multiple slots, the multiple slot SCI reserving resources for the group of multiple slots; and transmit one or more sidelink transmissions in the resources reserved in the group of multiple slots by the multiple slot SCI. In further aspects, a UE 104, or other device communicating based on sidelink, such as a second UE, may include a MSCI reception component 198 configured to receive a multiple slot SCI in a first slot of a group of multiple slots, the multiple slot SCI reserving resources for the group of multiple slots; and receive one or more sidelink transmissions in the resources reserved in the group of multiple slots by the multiple slot SCI. In still further aspects, the base station 180 may include a multiple slot configuration component 191 configured to receive configuration parameters for multiple slot SCI communicated between one or more UEs, the configuration parameters indicative of at least one of a starting location of a group of multiple slots or a number of slots included in the group of multiple slots; and configure, based on the configuration parameters, the one or more UEs with a multiple slot SCI configuration for transmitting the multiple slot SCI to reserve resources in the group of multiple slots.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming. Similarly, beamforming may be applied for sidelink communication, e.g., between UEs.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same. Although this example is described for the base station 180 and UE 104, the aspects may be similarly applied between a first and second device (e.g., a first and second UE) for sidelink communication.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
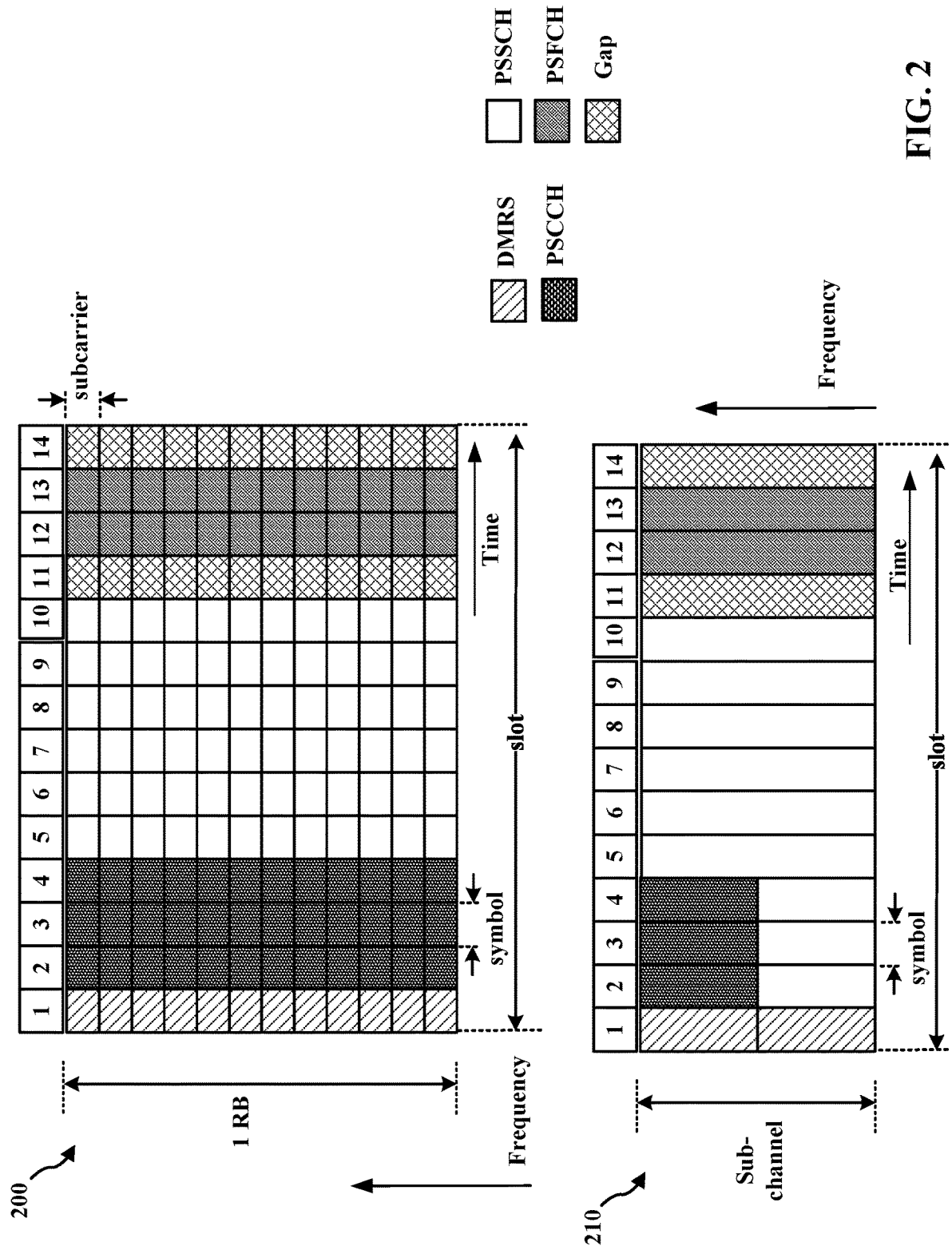
FIG. 2 illustrates example aspects of a sidelink slot structure.

FIG. 2 includes diagrams 200 and 210 illustrating example aspects of slot structures that may be used for sidelink communication (e.g., between UEs 104, RSU 107, etc.). The slot structure may be within a 5G/NR frame structure in some examples. In other examples, the slot structure may be within an LTE frame structure. Although the following description may be focused on 5G NR, the concepts described herein may be applicable to other similar areas, such as LTE, LTE-A, CDMA, GSM, and other wireless technologies. The example slot structure in FIG. 2 is merely one example, and other sidelink communication may have a different frame structure and/or different channels for sidelink communication. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. Diagram 200 illustrates a single resource block of a single slot transmission, e.g., which may correspond to a 0.5 ms transmission time interval (TTI). A physical sidelink control channel may be configured to occupy multiple physical resource blocks (PRBs), e.g., 10, 12, 15, 20, or 25 PRBs. The PSCCH may be limited to a single sub-channel. A PSCCH duration may be configured to be 2 symbols or 3 symbols, for example. A sub-channel may comprise 10, 15, 20, 25, 50, 75, or 100 PRBs, for example. The resources for a sidelink transmission may be selected from a resource pool including one or more subchannels. As a non-limiting example, the resource pool may include between 1-27 subchannels. A PSCCH size may be established for a resource pool, e.g., as between 10-100% of one subchannel for a duration of 2 symbols or 3 symbols. The diagram 210 in FIG. 2 illustrates an example in which the PSCCH occupies about 50% of a subchannel, as one example to illustrate the concept of PSCCH occupying a portion of a subchannel. The PSSCH occupies at least one subchannel. The PSCCH may include a first portion of SCI, and the PSSCH may include a second portion of SCI in some examples.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 2, some of the REs may comprise control information in PSCCH and some Res may comprise demodulation RS (DMRS). At least one symbol may be used for feedback. FIG. 2 illustrates examples with two symbols for a physical sidelink feedback channel (PSFCH) with adjacent gap symbols. A symbol prior to and/or after the feedback may be used for turnaround between reception of data and transmission of the feedback. The gap enables a device to switch from operating as a transmitting device to prepare to operate as a receiving device, e.g., in the following slot. Data may be transmitted in the remaining REs, as illustrated. The data may comprise the data message described herein. The position of any of the data, DMRS, SCI, feedback, gap symbols, and/or LBT symbols may be different than the example illustrated in FIG. 2. Multiple slots may be aggregated together in some aspects.

Figure 3:
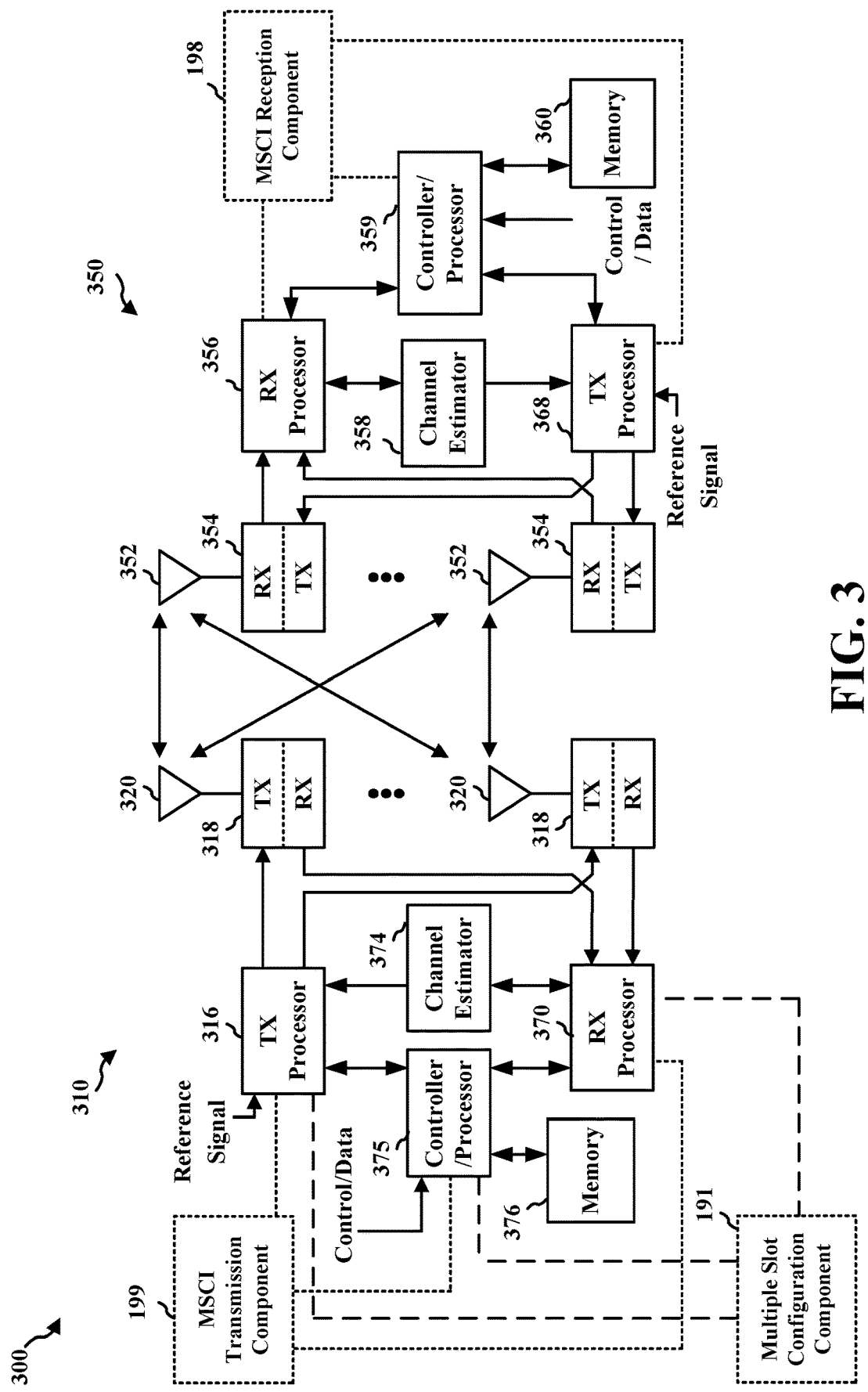
FIG. 3 is a diagram illustrating an example of a first device and a second device involved in wireless communication based, e.g., on sidelink.

FIG. 3 is a block diagram 300 of a first wireless communication device 310 in communication with a second wireless communication device 350 based on sidelink. In some examples, the devices 310 and 350 may communicate based on V2X or other D2D communication. The communication may be based on sidelink using a PC5 interface. The devices 310 and the 350 may comprise a UE, an RSU, a base station, etc. Packets may be provided to a controller/processor 375 that implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the device 350. Each spatial stream may then be provided to a different antenna 320 via a separate transmitter 318TX. Each transmitter 318TX may modulate an RF carrier with a respective spatial stream for transmission.

At the device 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the device 350. If multiple spatial streams are destined for the device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by device 310. These soft decisions may be based on channel estimates computed by the channel estimator 358. The soft decisions are then decoded and deinterleaved to recover the data and control signals that were originally transmitted by device 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. The controller/processor 359 may provide demultiplexing between transport and logical channels, packet reassembly, deciphering, header decompression, and control signal processing. The controller/processor 359 is also responsible for error detection using an ACK and/or NACK protocol to support HARQ operations.

Similar to the functionality described in connection with the transmission by device 310, the controller/processor 359 may provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by device 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The transmission is processed at the device 310 in a manner similar to that described in connection with the receiver function at the device 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. The controller/processor 375 provides demultiplexing between transport and logical channels, packet reassembly, deciphering, header decompression, control signal processing. The controller/processor 375 is also responsible for error detection using an ACK and/or NACK protocol to support HARQ operations.

At least one of the TX processor 368, the RX processor 356, and the controller/processor 359 may be configured to perform aspects in connection with the MSCI reception component 198 of FIG. 1.

At least one of the TX processor 316, the RX processor 370, and the controller/processor 375 may be configured to perform aspects in connection with the MSCI transmission component 199 of FIG. 1.

At least one of the TX processor 316/368, the RX processor 356/370, and the controller/processor 359/375 may be configured to perform aspects in connection with the multiple slot configuration component 191 of FIG. 1.

Sidelink communication may be based on a slot structure and may include a control channel (e.g., PSCCH), a corresponding data channel (e.g., PSSCH), a PSFCH, etc. A control channel may include information (e.g., sidelink control information (SCI)) for decoding the data channel including reservation information, such as information about time and/or frequency resources that are reserved for the data channel transmission. For example, the SCI may indicate a number of TTIs, as well as the RBs that will be occupied by the data transmission. The SCI may be transmitted in two portions, e.g., a first portion SCI-1 that may be transmitted in PSCCH and a second portion SCI-2 that may be transmitted in PSSCH.

The SCI may also be used by receiving devices to avoid interference by refraining from transmitting on the reserved resources. Sidelink communication may be based on different types or modes of resource allocation mechanisms. In a first resource allocation mode (which may be referred to herein as "Mode 1"), centralized resource allocation may be provided by a network entity. For example, a base station 102 or 180 may determine resources for sidelink communication and may allocate resources to different UEs 104 to use for sidelink transmissions. In this first mode, a UE receives the allocation of sidelink resources from the base station 102 or 180. In a second resource allocation mode (which may be referred to herein as "Mode 2"), distributed resource allocation may be provided. In Mode 2, each UE may autonomously determine resources to use for sidelink transmission. In order to coordinate the selection of sidelink resources by individual UEs, each UE may use a sensing technique to monitor for resource reservations by other sidelink UEs and may select resources for sidelink transmissions from unreserved resources. Devices communicating based on sidelink, may determine one or more radio resources in the time and frequency domain that are used by other devices in order to select transmission resources that avoid collisions with other devices. The sidelink transmission and/or the resource reservation may be periodic or aperiodic.

Thus, in the second mode (e.g., Mode 2), individual UEs may autonomously select resources for sidelink transmission, e.g., without a central entity such as a base station indicating the resources for the device. A first UE may reserve the selected resources in order to inform other UEs about the resources that the first UE intends to use for sidelink transmission(s).

In some examples, the resource selection for sidelink communication may be based on a sensing-based mechanism. For instance, before selecting a resource for a data transmission, a UE may first determine whether resources have been reserved by other UEs.

For example, as part of a sensing mechanism for resource allocation mode 2, the UE may determine (e.g., sense) whether the selected sidelink resource has been reserved by other UE(s) before selecting a sidelink resource for a data transmission. If the UE determines that the sidelink resource has not been reserved by other UEs, the UE may use the selected sidelink resource for transmitting the data, e.g., in a PSSCH transmission. The UE may estimate or determine which radio resources (e.g., sidelink resources) may be in-use and/or reserved by others by detecting and decoding sidelink control information (SCI) transmitted by other UEs. The UE may use a sensing-based resource selection algorithm to estimate or determine which radio resources are in-use and/or reserved by others. The UE may receive SCI from another UE that includes reservation information based on a resource reservation field comprised in the SCI. The UE may continuously monitor for (e.g., sense) and decode SCI from peer UEs. The SCI may include reservation information, e.g., indicating the slot and RBs that a particular UE has selected for a future transmission. The UE may exclude resources that are used and/or reserved by other UEs from a set of candidate resources for sidelink transmission by the UE, and the UE may select/reserve resources for a sidelink transmission from the resources that are unused and therefore form the set of candidate resources. The UE may continuously perform sensing for SCI with resource reservations in order to maintain a set of candidate resources from which the UE may select one or more resources for a sidelink transmission. Once the UE selects a candidate resource, the UE may transmit SCI indicating its own reservation of the resource for a sidelink transmission. The number of resources (e.g., sub-channels per subframe) reserved by the UE may depend on the size of data to be transmitted by the UE. Although the example is described for a UE receiving reservations from another UE, the reservations may also be received from an RSU or other device communicating based on sidelink.

The UE may determine an associated signal measurement (such as RSRP) for each resource reservation received by another UE. The UE may consider resources reserved in a transmission for which the UE measures an RSRP below a threshold to be available for use by the UE. A UE may perform signal/channel measurement for a sidelink resource that has been reserved and/or used by other UE(s), such as by measuring the RSRP of the message (e.g., the SCI) that reserves the sidelink resource. Based at least in part on the signal/channel measurement, the UE may consider using/reusing the sidelink resource that has been reserved by other UE(s). For example, the UE may exclude the reserved resources from a candidate resource set if the measured RSRP meets or exceeds the threshold, and the UE may consider a reserved resource to be available if the measured RSRP for the message reserving the resource is below the threshold. The UE may include the resources in the candidate resources set and may use/reuse such reserved resources when the message reserving the resources has an RSRP below the threshold, because the low RSRP indicates that the other UE is distant and a reuse of the resources is less likely to cause interference to that UE. A higher RSRP indicates that the transmitting UE that reserved the resources is potentially closer to the UE and may experience higher levels of interference if the UE selected the same resources.

For example, in a first step, the UE may determine a set of candidate resources (e.g., by monitoring SCI from other UEs and removing resources from the set of candidate resources that are reserved by other UEs in a signal for which the UE measures an RSRP above a threshold value). In a second step, the UE may select N resources for transmissions and/or retransmissions of a TB. As an example, the UE may randomly select the N resources from the set of candidate resources determined in the first step. In a third step, for each transmission, the UE may reserve future time and frequency resources for an initial transmission and up to two retransmissions. The UE may reserve the resources by transmitting SCI indicating the resource reservation.

The reliability/range of such sidelink communication may be impacted in some cases based on SNR losses (e.g., due to blockages), UE rotation (e.g., particularly in mmW communications), deep-indoor penetration losses, etc. The reliability/range of the sidelink communications may be improved by increasing a number of repeated sidelink transmissions, e.g., to more than 3 repeated transmissions, for each resource reservation. In order to increase the number of repeated sidelink transmissions, e.g., to more than 3 repeated transmissions, which may improve the reliability at a receiver UE for decoding the sidelink transmissions.

In some aspects, sidelink may be used to provide coverage extension for UEs that are out of coverage of a base station. For example, in FIG. 1, one UE 104 may be in coverage of a base station 102/180 or may have improved coverage by the base station and may relay downlink communication from the base station 102/180 to another UE 104 that may be out of coverage or experiencing poor reception. Among other benefits, the improved reliability through increased repetition of the sidelink transmissions may help to extend sidelink relay coverage to be closer to a Uu range for Uu coverage extension applications.

The repeated transmission of the PSCCH in multiple slots increases the amount of overhead in the communication system. Aspects presented herein enable improved reliability for sidelink communication through added repetitions, e.g., beyond 3 transmissions, with reduced control overhead through a super-slot structure of a group of multiple slots.

Accordingly, the first UE may transmit multiple-slot sidelink control information (MSCI) configured to reserve more resources at one time than may be reserved by single slot sidelink control information (SCI). The MSCI may be associated with a frame structure that includes a group of multiple slots comprising a first slot/header slot for the MSCI, and one or more additional slots/non-header slots that do not include the MSCI. Aspects presented herein provide for more efficient control signaling for sidelink resources by providing control information for the group of multiple slots in the header slot, which may be utilized for reserving resources for all of the one or more additional slots included in the group of multiple slots at the same time. An increased amount of resources may be allocated to control information in the first slot/header slot based on the MSCI to reduce overhead by not having to repeat transmissions of the control information in the one or more additional slots. The MSCI may also be used to reserve resources in one or more subsequent slots (e.g., subsequent header slots) of one or more subsequent groups of multiple slots.

Figure 4:
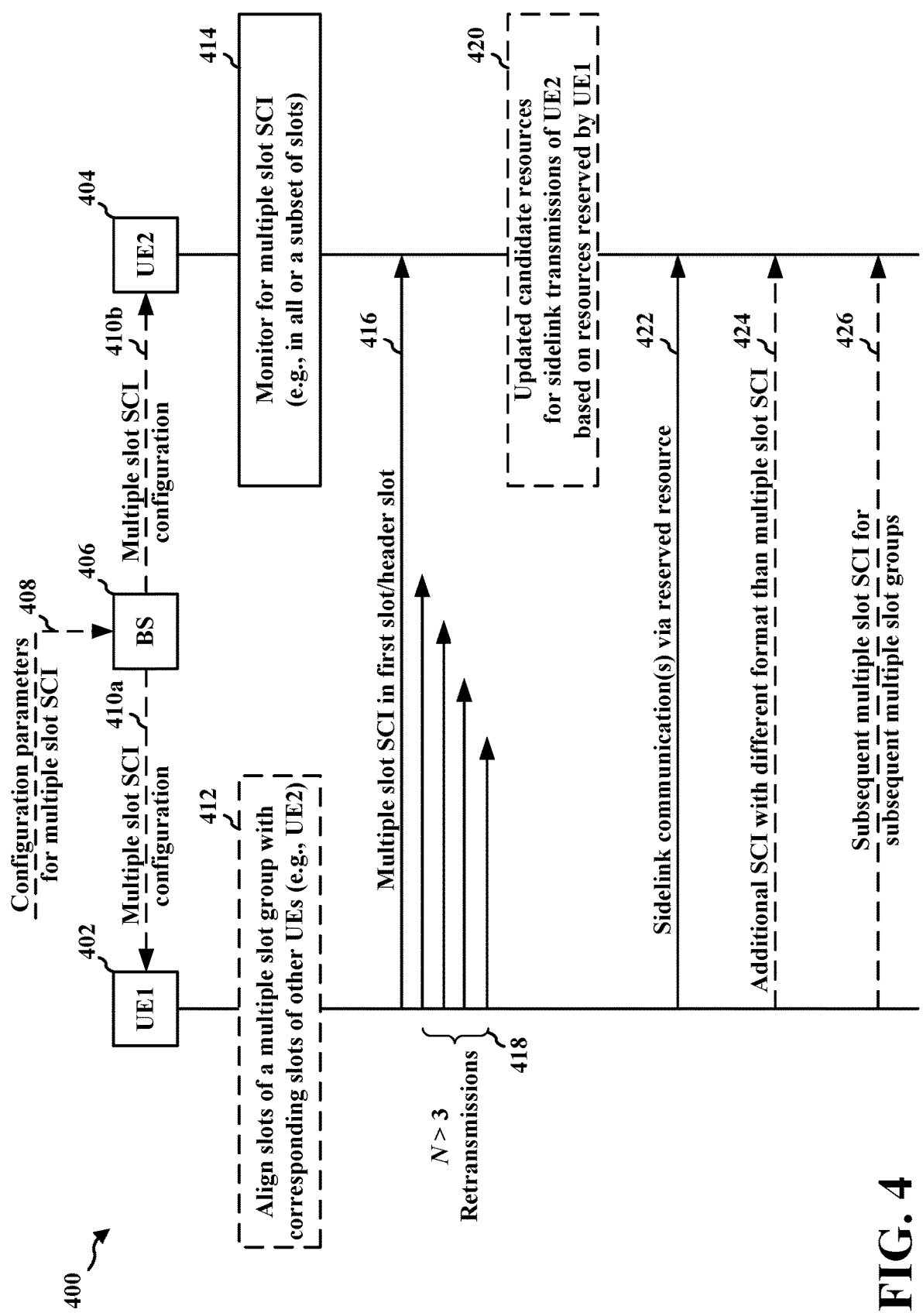
FIG. 4 is a call flow diagram illustrating communications between a first UE, a second UE, and a base station.

FIG. 4 is a call flow diagram 400 illustrating communication between a first UE 402, a second UE 404. In some aspects, the communication may also be exchanged with a base station 406. At 408, the base station 406 may receive system configuration parameters for multiple slot SCI to be communicated between the first UE 402 and the second UE 404. The multiple slot SCI is configured to reserve resources for a group of multiple slots, rather than only a next slot, e.g., as described in more detail in connection with FIGS. 5A-5C and 6A-6B. For example, the multiple slot SCI may reserve resources for more than three transmissions. In some aspects, the group of multiple slots may be referred to as a super-slot or by another name. The term "multiple slot SCI or MSCI" is used herein to refer to an SCI that reserves resources for slot group of multiple slots in order to illustrate the concept. Such SCI that reserves resources for a slot group of multiple slots may also be referred to by a different name.

At 410a, the base station 406 may configure the first UE 402 with a multiple slot SCI configuration based on the configuration parameters. At 410b, the base station 406 may configure the second UE 404 with the multiple slot SCI configuration based on the configuration parameters.

At 412, the first UE 402 may align slots of the multiple slot group with corresponding slots of other UEs (e.g., the second UE 404), e.g., as described in more detail in connection with FIG. 7A. The alignment, at 412, may be based on the multiple slot SCI configuration(s) transmitted, at 410a-410b, from the base station 406. At 414, the second UE 404 may monitor for multiple slot SCI, e.g., from the first UE 402. The second UE 404 may monitor, at 414, for the multiple slot SCI in all slots of the multiple slot group or a subset of slots of the multiple slot group. At 416, the first UE 402 may transmit multiple slot SCI in a first slot/header slot of the multiple slot group to the second UE 404. At 418, the first UE 402 may retransmit the multiple slot SCI to the second UE 404 via retransmissions (N), where N may be greater than 3.

The second UE 404 may update, at 420, candidate resources for sidelink transmissions of the second UE 404 based on excluding resources reserved by the first UE 402 via the multiple slot SCI. At 422, the first UE 402 may transmit sidelink communication(s) via the reserved resources to the second UE 404. At 424, the first UE 402 may transmit, to the second UE 404, additional SCI with a different format than the multiple slot SCI. As used herein, the term "format" refers to one or more types of scheduling information indicated via SCI. The additional SCI may include SCI-1 and/or SCI-2. In examples, the additional SCI may be transmitted in a non-header slot of the multiple slot group. At 426, the first UE 402 may further transmit, to the second UE 404, subsequent multiple slot SCI for reserving resources in subsequent multiple slot groups.

Figure 5A:
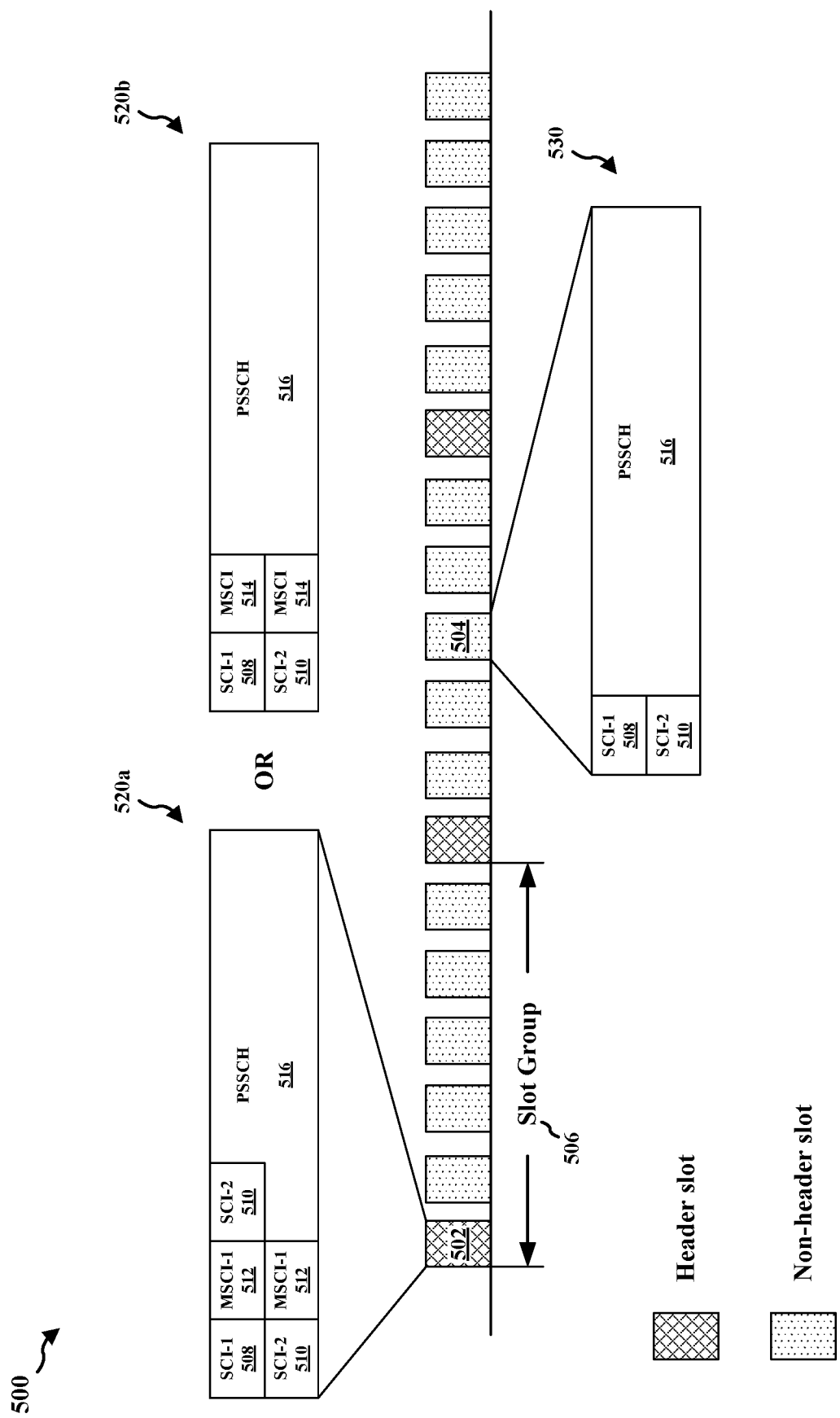
FIG. 5A illustrates a diagram of a slot structure for a sidelink user equipment (UE).

FIG. 5A illustrates a diagram 500 of a slot group structure for a sidelink UE. The slot group structure may also be referred to as a super-slot structure. A first UE may communicate via sidelink with a second UE that is located within a communication range of the first UE. In cases where the first UE is within a coverage area of a base station, but the second UE is located outside the coverage area of the base station, such sidelink communications may be performed to effectively extend the communication range of the base station to the second UE. Sidelink relaying techniques may also be performed to provide power savings, trunking gain, etc. A range of sidelink relaying may be extended in some examples to correspond to range extensions of Uu links. Extending the range/coverage area of sidelink channels may increase performance impacts caused by SNR losses (e.g., due to blockages), UE rotation (e.g., particularly in mmW communications), deep-indoor penetration losses, etc. By increasing a number of repeated sidelink transmissions, e.g., to more than 3 repeated transmissions, for each resource reservation, a reliability of the sidelink communications between the first UE and the second UE may be improved.

In order to increase the number of repeated sidelink transmissions, e.g., to more than 3 repeated transmissions, the PSSCH 516 and the PSCCH may be transmitted in a same slot, which may include control channels associated with SCI-1 508 and SCI-2 510. SCI-1 508 may indicate a reserved resource for performing the repeated transmissions and may be used by other UEs for determining a resource allocation. SCI-2 510 may include a destination identifier (ID) for an intended receiver. A receiver UE may also be configured to decode the SCI-1 508 and the SCI-2 510 with reduced latency. Therefore, transmissions that include a multiple slot SCI format 520a-520b (e.g., that includes SCI-1 508 and/or SCI-2 510) may be repeated multiple times within a predetermined timeframe in order for a receiver UE located at an increased distance from a transmitter UE to decode the multiple slot SCI format 520a-520b.

A first multiple slot SCI format 520a may include SCI-1 508, multiple slot SCI-1 (MSCI-1) 512, which may be repeated, SCI-2 510 which may also be repeated, and PSSCH 516. A second multiple slot SCI format 520*b* may include SCI-1 508, SCI-2 510, and MSCI 514, which may be repeated and which may be a combination of MSCI-1 512 and a multiple slot SCI-2 (MSCI-2). MSCI-1 512/MSCI 514 may be utilized for reserving more resources than may be reserved by single slot SCI, such as SCI-1 508 and SCI-2 510. In both configurations, the multiple slot SCI format 520*a*-520*b* may include an updated control path indicative of the multiple slot SCI format 520*a*-520*b*. If control information were to be included in each slot of the sidelink frames, and the transmissions were to be repeat (e.g., more than 3 times), the control channel may have a high overhead.

A frame structure that includes a slot group 506 may be used to extend a communication range for a UE via sidelink communications. In examples, the slot group 506 may be referred to as a "super-slot" and may comprise a first slot/header slot 502 that includes the multiple slot SCI format 520*a*-520*b*, and one or more additional slots 504 that do not include the multiple slot SCI format 520*a*-520*b*. Control information for the slot group 506 may be limited to the header slot 502. Thus, the MSCI-1 512/MSCI 514 may be utilized to reserve resources for all of the one or more additional slots 504 included in the slot group 506, rather than only a next slot, as may be performed in association with SCI-1 508 and/or SCI-2 510 via a single slot format 530. Accordingly, the multiple slot SCI format 520*a*-520*b* may occur once per slot group 506 (e.g., once per super-slot) at the first slot/header slot 502 of the slot group 506, and the one or more additional slots may include a single slot SCI format 530, such as SCI-1 508 and/or SCI-2 510. An increased amount of resources may be allocated to control information in the first slot/header slot 502 based on the multiple slot SCI format 520*a*-520*b*. Thus, overhead may be reduced by not repeating transmissions of the control information in the one or more additional slots 504.

Some UEs may rely on decoding the single slot SCI format 530 including SCI-1 508 and SCI-2 510, while other UEs may be configured to decode the multiple slot SCI formats 520*a*-520*b*, which may include MSCI-1 512 and MSCI 514, as well as the single slot SCI. The second multiple slot SCI format 520*b* that includes the MSCI 514 may be different from the first multiple slot SCI format 520*a* that includes MSCI-1 512, in that the MSCI 514 may be based on a combination of information associated with MSCI-1 512 and MSCI-2. In the first multiple slot SCI format 520*a*, additional bits may be added to SCI-2 510 for extending the coverage area, where transmission of the SCI-2 510 may be repeated with the additional bits to provide increased reliability for distant UEs that may receive and decode the SCI-2 510 that includes the additional bits. In the second multiple slot SCI format 520*b*, the additional bits may be included in the MSCI 514, rather than being added to the SCI-2 510.

Figure 5B:
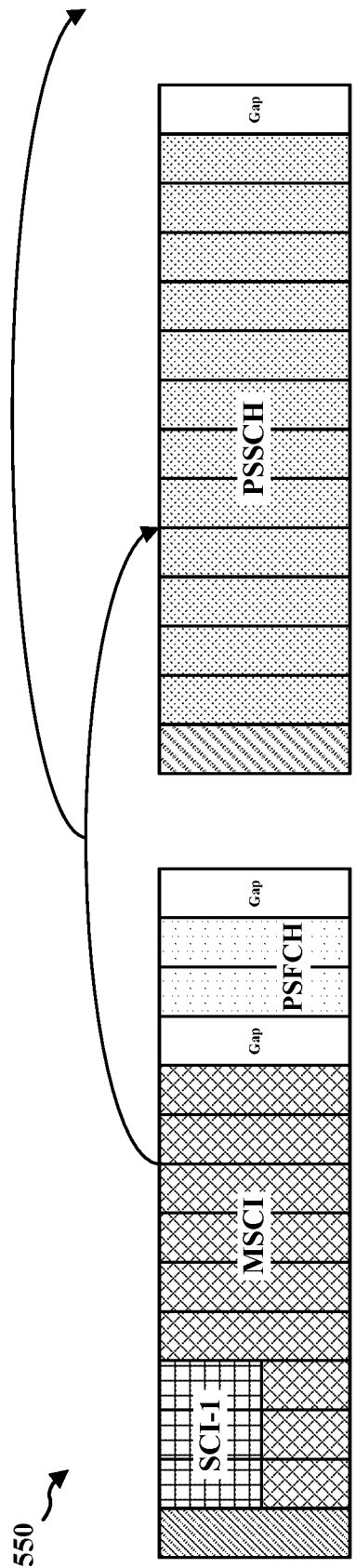
FIGS. 5B-5C illustrate diagrams associated with sidelink control information (SCI) repetitions in a sidelink slot.
Figure 5C:
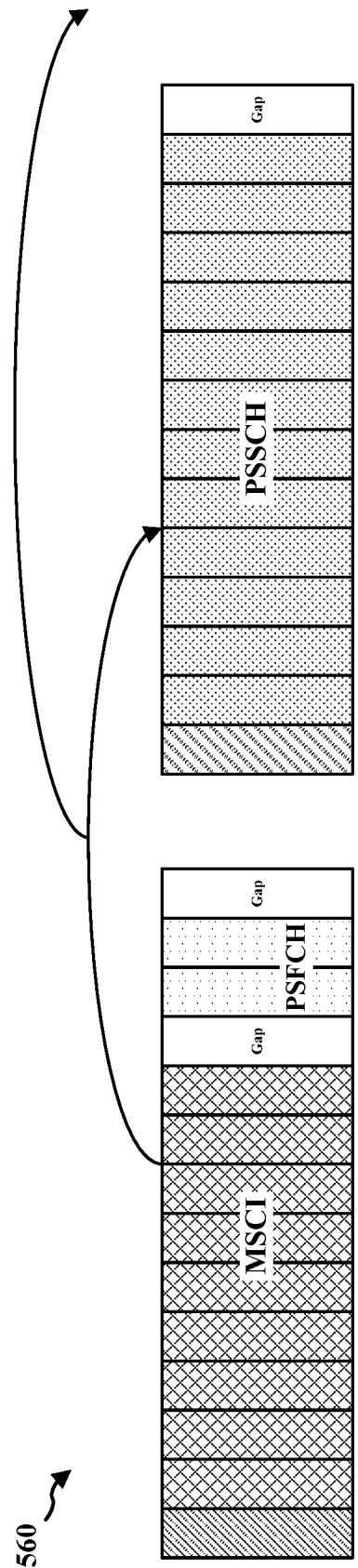

FIGS. 5B-5C illustrate diagrams 550-560 associated with SCI repetitions in a sidelink slot. In cases where SCI transmission repetitions utilize a majority of a sidelink slot (e.g., header slot 502), the entire sidelink slot may be utilized for transmitting SCI, as illustrated in the diagrams 550-560. That is, an increased amount of control information (e.g., MSCI 514/SCI-1 508) being included in the first slot/header slot 502 may limit available remaining resources in the first slot/header slot 502 for transmitting data (e.g., PSSCH). Thus, the one or more additional slots 504 may be used for transmitting the data, e.g., as data-only slots (e.g., PSSCH-only slots). If a reservation bit in SCI-1 508 is used to indicate the multiple slot SCI format 520*a*-520*b*, SCI-2 510 may be omitted. In instances where backward-compatibility with certain UEs is not to be provided, such as deployments focused on super-slot structures, SCI-1 508 may be omitted, as illustrated in the diagram 560, and all of the control information may be included in MSCI-1 512/MSCI 514.

FIGS. 6A-6B illustrate diagrams 600-650 of resource reservation techniques. MSCI may be used to reserve resources for a plurality of slots and slot groups of a frame structure. For example, the MSCI may indicate sidelink resources to be used for a next k−1 header slots 602 of the plurality of slot groups as well as a position of the next k−1 header slots 602 within each of the plurality of slot groups. The MSCI may further indicate sidelink resources to be used for the one or more additional slots 604 associated with a particular transmission.

In a first aspect, MSCI included in the header slot 602 may be utilized to reserve resources for a current slot group of the plurality of slot groups. For example, the header slot 602 of the current slot group may reserve resources for the current slot group, such as the one or more additional slots 604 included in the current slot group. The header slot 602 may also reserve one or more subsequent header slots 603 of one or more subsequent slot groups of the plurality of slot groups. Limiting a number of the one or more additional slots 604 reserved by the header slot 602 may reduce the MSCI payload, as resource selection for subsequent sets of one or more additional slots 605 of the plurality of slot groups may be performed at each of the subsequent slot groups, rather than at the current slot group.

In a second aspect, the MSCI included in the header slot 602 may be used to reserve resources for all of the plurality of slot groups of the frame structure. For example, the header slot 602 of the current slot group may reserve both subsequent header slots (e.g., subsequent header slot 603) and subsequent sets of one or more additional resources 605 for one or more remaining slot groups of the plurality of slot groups. A resource selection timeline may be implemented for reserving resources for all of the plurality of slot groups at a same time. An increased amount of resources being reserved at the same time may correspond to a MSCI payload being increased.

The diagram 600 illustrates resource reservations of a slot structure from a perspective of a UE that follows a successive reservation technique. That is, each transmission may include SCI-1 that points to a next reserved repetition resource, as some UE may not be configured to distinguish header slots 602-603 from non-header slots (e.g., the one or more additional slots 604-605). In further configurations, the SCI-1 may point to the next two reserved repetition resources. Since certain UEs may rely on decoding SCI-1 and SCI-2, which may be included in both the header slots 602-603 and the non-header slots (e.g., the one or more additional slots 604-605), the certain UEs may perform the local/successive reservation technique indicated via the diagram 600.

The diagram 650 illustrates resource reservations of a slot structure from a perspective of a UE that does not rely on the local/successive reservation technique. That is, each transmission may include MSCI that points to a subsequent slot group(s) as well as SCI-1 that points to the next reserved repetition resource. The MSCI may further indicate a reservation pattern of a transmission of the current slot group to the one or more subsequent slot groups of the plurality of slot groups. Thus, the UE may determine one or more resource reservations for one or more header slots (e.g., header slots 602-603) and the one or more additional slots 604 included in the current slot group.

Figure 7A:
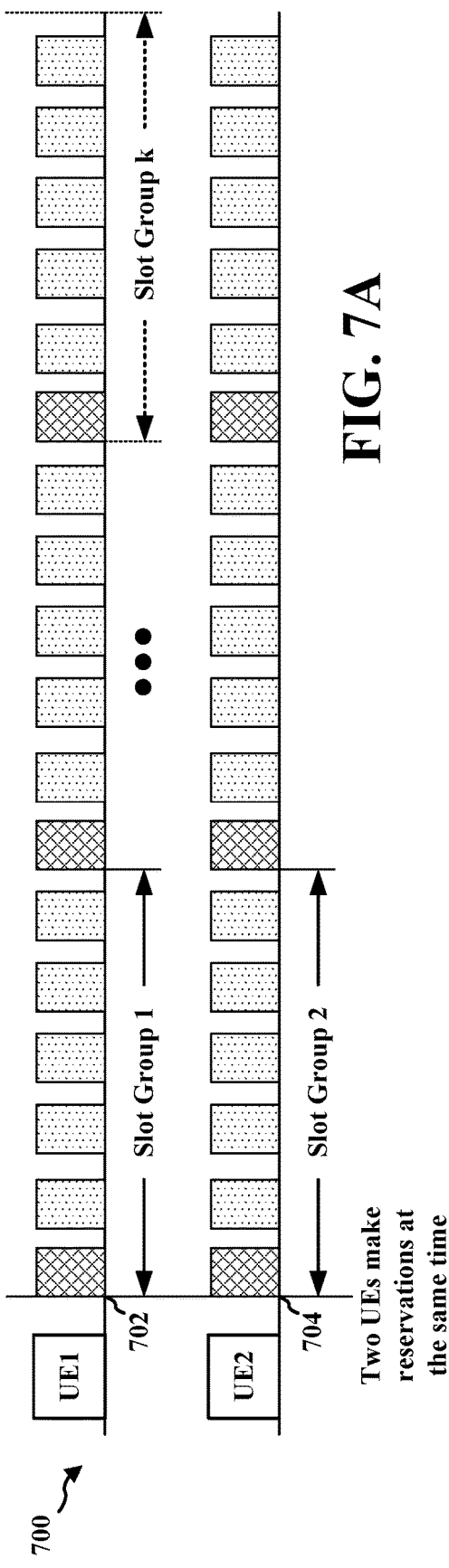
FIGS. 7A-7B illustrates diagrams indicative of an alignment between slot structures of different UEs.
Figure 7B:
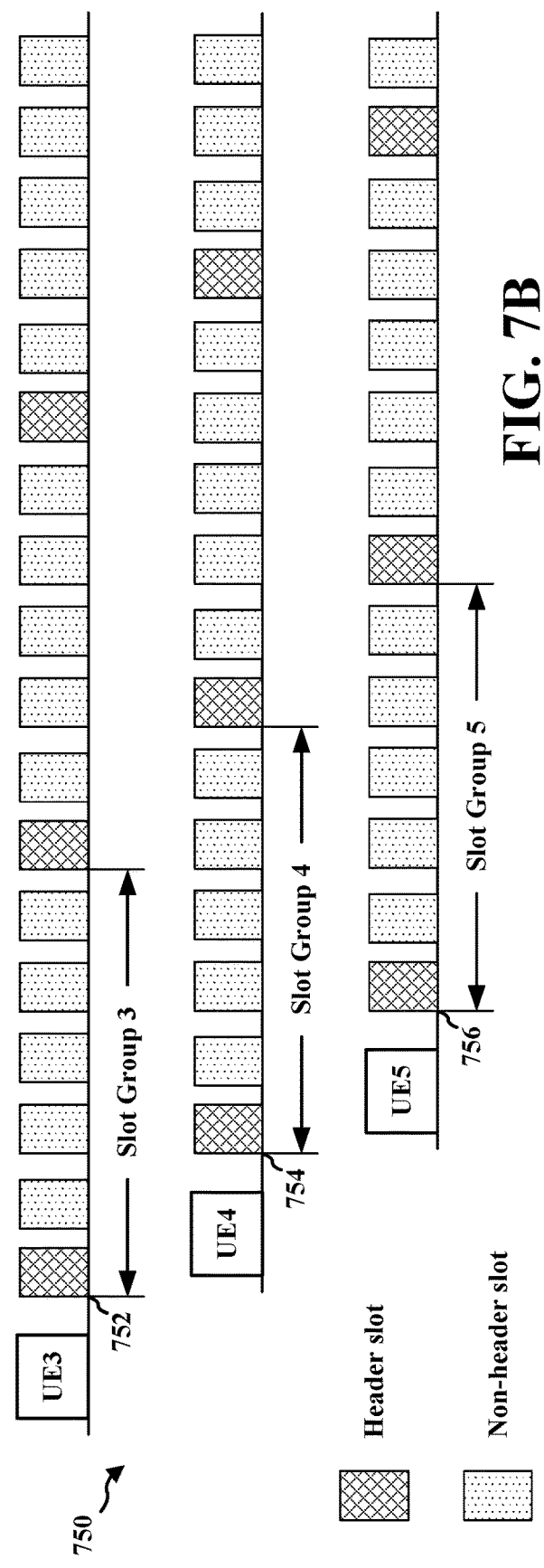

FIGS. 7A-7B illustrate diagrams 700-750 indicative of an alignment between slot structures of different UEs. The plurality of slot groups included in the slot structures of the different UEs may be aligned or not aligned.

The diagram 700 illustrates an aligned set of slot structures (e.g., a first slot structure 702 for UE1 and a second slot structure 704 for UE2). That is, slot groups of UE1 and UE2, such as slot group 1 and slot group 2, may be aligned. Alignment between the first slot structure 702 and the second slot structure 704 may allow receiver UEs to perform a decreased amount of blind decoding. However, if two different UEs, such as UE1 and UE2, reserve a same resource at a same time (e.g., based on respective header slots being aligned), a resource collision may occur. Nevertheless, due to limited preconfigured locations for the header slots, a UE may not monitor all of the slots included in the slot group, as the locations of non-header slots may be determined based on the alignment between the first slot structure 702 and the second slot structure 704.

While transmitter UEs may monitor particular slots for the multiple slot SCI format in order to allocate resources, the transmitter UEs may not determine reservations of the current slot group when operating based on a half-duplex mode. Resource determination errors/collisions may be more prominent in association with slot groups/super-slot structures, as more slots included in the slot groups may be reserved at the same time.

The diagram 750 illustrates a non-aligned set of slot structures. If the set of slot structures are non-aligned, receiver UEs may monitor each slot of the slot group for decoding MSCI. Transmitter UEs may similarly monitor each slot for the multiple slot SCI format in order to allocate resources. In the diagram 750 of the non-aligned set of slot structures, a third slot structure 752 (e.g., including slot group 3) may correspond to UE3, a fourth slot structure 754 (e.g., including slot group 4) may correspond to UE4, and a fifth slot structure 756 (e.g., including slot group 5) may correspond to UE5. A number of non-header slots located between the header slots of adjacent slot groups may be different among the set of slot structures. Such differences may provide increased flexibility for reducing resource collision. However, if a receiver UE has not determined a configuration being used by a transmitter UE, the receiver UE may monitor an increased number of slots in each slot group.

In order to reduce overhead associated with monitoring for the multiple slot SCI format, parameters indicative of patterns within the slot groups may be preconfigured. For example, instead of having full flexibility among the patterns included in the sets of slot structures, locations of header slots may be limited to a reduced number of locations. System configuration parameters may be indicative of a number of slots included in each slot group, where the number of slots may be based on a particular type of deployment and/or an amount of resources to be used in association with the particular type of deployment. In examples, a base station may configure a length and/or a starting location of the slot groups (e.g., slot group 1, slot group 2, slot group 3, slot group 4, slot group 5, etc.) included in the different slot structures. Even in cases of aligned sets of slot structures, the base station may indicate the locations of header slots in the slot structures.

Figure 8:
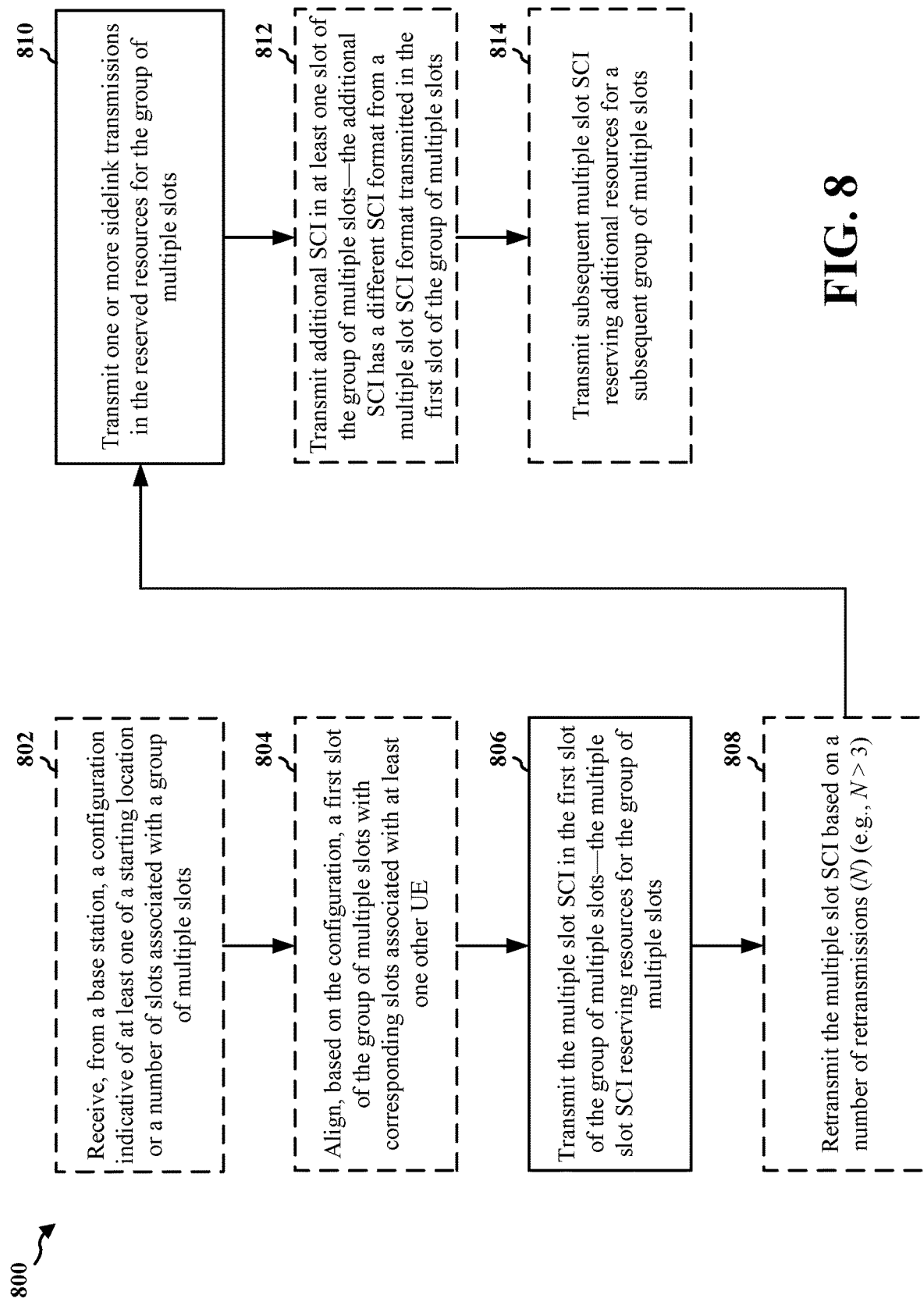
FIG. 8 is a flowchart of a method of wireless communication at a first UE.

FIG. 8 is a flowchart 800 of a method of wireless communication. The method may be performed by a first UE (e.g., the UE 104/402; the apparatus 1102; etc.), which may include the memory 360 and which may be the entire UE 104/402 or a component of the UE 104/402, such as the TX processor 368, the RX processor 356, and/or the controller/processor 359. One or more of the aspects illustrated in FIG. 8 may be optional. Various implementations may include a method with any combination of the aspects described in connection with FIG. 8. The method may enable the UE 104/402 to increase a coverage area associated with sidelink communications.

At 802, the UE may receive, from a base station, a configuration indicative of at least one of a starting location or a number of slots associated with a group of multiple slots. For example, referring to FIG. 4, the first UE 402 may receive, at 410a, a multiple slot SCI configuration from the base station 406. The reception may be performed, e.g., by the reception component 1130 of the apparatus 1102 in FIG. 11.

At 804, the UE may align, based on the configuration, a first slot of the group of multiple slots with corresponding slots associated with at least one other UE. For example, referring to FIGS. 4 and 7A, the first UE 402 may align, at 412, slots of a multiple slot group with corresponding slots of other UEs (e.g., the second UE 404). In the diagram 700, slot group 1 is aligned with slot group 2. The alignment may be performed, e.g., by the alignment component 1140 of the apparatus 1102 in FIG. 11.

At 806, the UE may transmit the multiple slot SCI in the first slot of the group of multiple slots—the multiple slot SCI reserving resources for the group of multiple slots. For example, referring to FIGS. 4-6B, the first UE 402 may transmit, at 416, multiple slot SCI in a first slot/header slot to the second UE 404. In the diagrams 500-600, the first slot/header slots 502/602 include multiple slot SCI 512-514 for reserving resources in one or more additional slots 504/604 and/or one or more subsequent header slots 603. Each group of multiple slots (e.g., slot group 506) may include one header slot 502 for the multiple slot SCI 512-514 and at least one non-header slot (e.g., one or more additional slots 504) for additional SCI (e.g., SCI-1 508 and SCI-2 510). A header slot format (e.g., 520a-520b) may include control resources and not data resources, and at least one non-header slot format (e.g., 530) may include the control resources and the data resources. A format of the first slot 502 may include control resources for the multiple slot SCI 512-514 and additional resources for at least one of SCI-1 508 for a single slot, SCI-2 510 for the single slot, or a PSSCH 516. The multiple slot SCI 512-514 may include at least one of the SCI-1 508 or the SCI-2 510 for the resources in the group of multiple slots (e.g., slot group 506). A format of the first slot 502 may include control resources for the multiple slot SCI 512-514 and not for a single slot SCI or data. The multiple slot SCI 512 may include a resource reservation for one or more header slots 502/602 of one or more subsequent groups of multiple slots and for at least one non-header slot of the one or more subsequent groups of multiple slots. The transmission may be performed, e.g., by the transmission component 1134 of the apparatus 1102 in FIG. 11.

At 808, the UE may retransmit the multiple slot SCI based on a number of retransmissions (N) (e.g., N>3). For example, referring to FIGS. 4-6B, the first UE 402 may retransmit, at 418, the multiple slot SCI based on N>3. The first slot may include a header slot (e.g., 502/602), and a retransmission of the multiple slot SCI 512-514 may occur in at least one of the first slot of the group of multiple slots (e.g., 502/602) or the header slot (e.g., 603) of one or more subsequent groups of multiple slots. The header slot 502 may include a format comprising control resources for the multiple slot SCI 512-514 and not data resources. The retransmission may be performed, e.g., by the retransmission component 1142 of the apparatus 1102 in FIG. 11.

At 810, the UE may transmit one or more sidelink transmissions in the reserved resources for the group of multiple slots. For example, referring to FIG. 4, the first UE 402 may transmit, at 422, sidelink communication(s) via reserved resources associated with the multiple slot group. The transmission may be performed, e.g., by the transmission component 1134 of the apparatus 1102 in FIG. 11.

At 812, the UE may transmit additional SCI in at least one slot of the group of multiple slots—the additional SCI has a different SCI format from a multiple slot SCI format transmitted in the first slot of the group of multiple slots. For example, referring to FIGS. 4-5A, the first UE 402 may transmit, at 424, additional SCI with a different format than the multiple slot SCI. In the diagram 500, the slot format 530 for the one or more additional slots 504 comprises a different slot format than the multiple slot SCI formats 520a-520b. The transmission may be performed, e.g., by the transmission component 1134 of the apparatus 1102 in FIG. 11.

At 814, the UE may transmit subsequent multiple slot SCI reserving additional resources for a subsequent group of multiple slots. For example, referring to FIG. 4, the first UE 402 may transmit, at 426, subsequent multiple slot SCI for subsequent multiple slot groups. In the diagram 600, the subsequent header slot 603 may reserve subsequent additional resources 605 of a subsequent group of multiple slots. The multiple slot SCI 512-514 may further indicate a future slot for transmission of a subsequent multiple slot SCI (e.g., included in subsequent header slot 603) corresponding to a subsequent group of multiple slots. The transmission may be performed, e.g., by the transmission component 1134 of the apparatus 1102 in FIG. 11.

Figure 9:
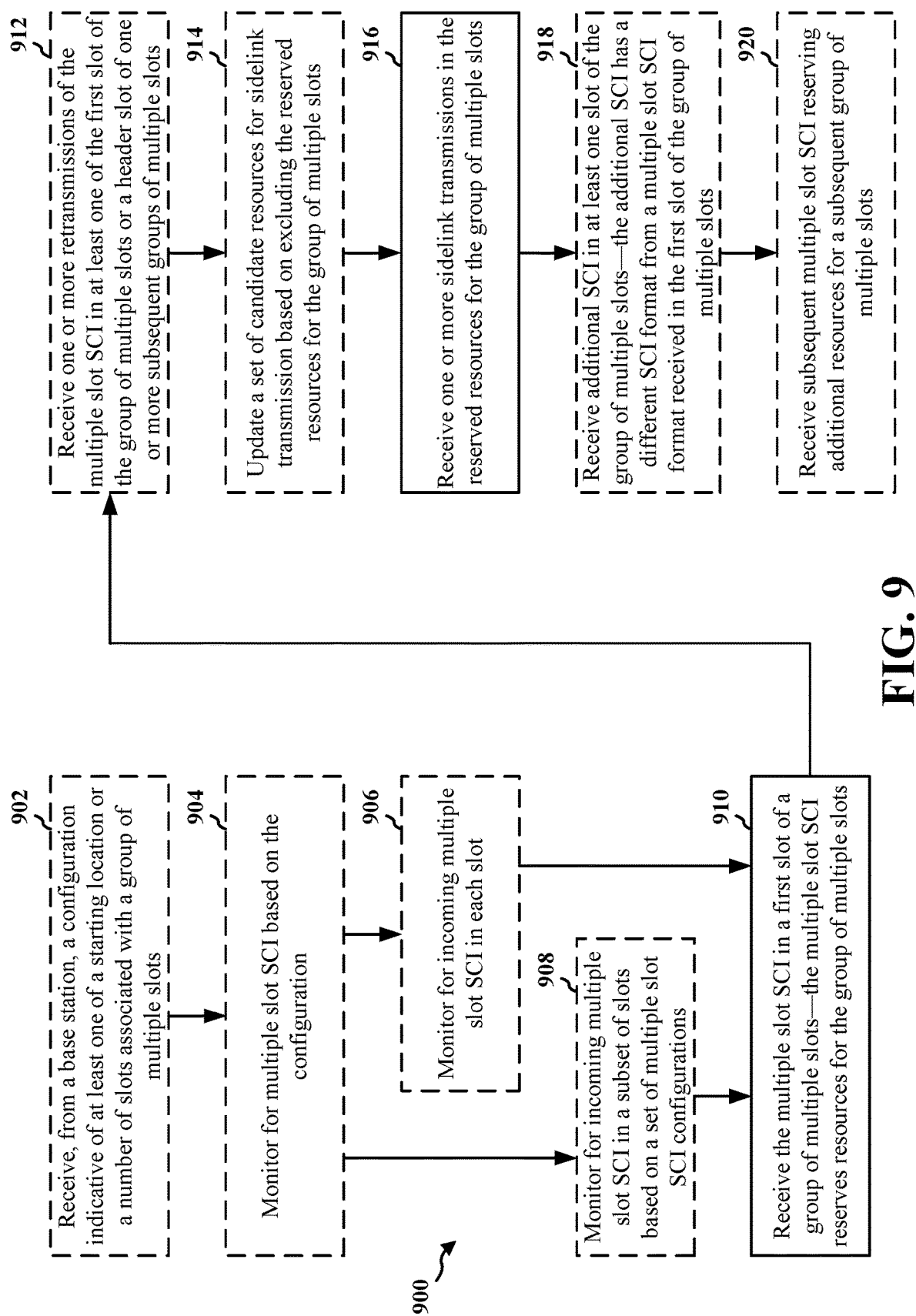
FIG. 9 is a flowchart of a method of wireless communication at a second UE.

FIG. 9 is a flowchart 900 of a method of wireless communication. The method may be performed by a second UE (e.g., the UE 104/404; the apparatus 1102; etc.), which may include the memory 360 and which may be the entire UE 104/404 or a component of the UE 104/404, such as the TX processor 368, the RX processor 356, and/or the controller/processor 359. One or more of the aspects illustrated in FIG. 9 may be optional. Various implementations may include a method with any combination of the aspects described in connection with FIG. 9. The method may enable the UE 104/404 to increase a coverage area associated with sidelink communications.

At 902, the UE may receive, from a base station, a configuration indicative of at least one of a starting location or a number of slots associated with a group of multiple slots. For example, referring to FIG. 4, the second UE 404 may receive, at 410b, a multiple slot SCI configuration from the base station 406. The reception may be performed, e.g., by the reception component 1130 of the apparatus 1102 in FIG. 11.

At 904, the UE may monitor for multiple slot SCI based on the configuration. For example, referring to FIGS. 4-5A, the second UE 404 may monitor, at 414, for multiple slot SCI, which may correspond to the multiple slot SCI 512-514 in the diagram 500. The monitoring may be performed, e.g., by the monitor component 1144 of the apparatus 1102 in FIG. 11.

At 906, the UE may monitor for incoming multiple slot SCI in each slot. For example, referring to FIG. 4, the second UE 404 may monitor, at 414, for multiple slot SCI in all slots of the multiple slot group. The monitoring may be performed, e.g., by the monitor component 1144 of the apparatus 1102 in FIG. 11.

At 908, the UE may (e.g., alternatively) monitor for incoming multiple slot SCI in a subset of slots based on a set of multiple slot SCI configurations. For example, referring to FIG. 4, the second UE 404 may monitor, at 414, for multiple slot SCI in a subset of slots of the multiple slot group. The monitoring may be performed, e.g., by the monitor component 1144 of the apparatus 1102 in FIG. 11.

At 910, the UE may receive the multiple slot SCI in a first slot of a group of multiple slots—the multiple slot SCI reserves resources for the group of multiple slots. For example, referring to FIGS. 4-6B, the second UE 404 may receive, at 416, multiple slot SCI in a first slot/header slot from the first UE 402. In the diagrams 500-600, the first slot/header slots 502/602 include multiple slot SCI 512-514 for reserving resources in one or more additional slots 504/604 and/or one or more subsequent header slots 603. Each group of multiple slots (e.g., slot group 506) may include one header slot 502 for the multiple slot SCI 512-514 and at least one non-header slot (e.g., one or more additional slots 504) for additional SCI (e.g., SCI-1 508 and SCI-2 510). A header slot format (e.g., 520a-520b) may include control resources and not data resources, and at least one non-header slot format (e.g., 530) may include the control resources and the data resources. A format of the first slot 502 may include control resources for the multiple slot SCI 512-514 and additional resources for at least one of SCI-1 508 for a single slot, SCI-2 510 for the single slot, or a PSSCH 516. The multiple slot SCI 512-514 may include at least one of the SCI-1 508 or the SCI-2 510 for the resources in the group of multiple slots (e.g., slot group 506). A format of the first slot 502 may include control resources for the multiple slot SCI 512-514 and not for a single slot SCI or data. The multiple slot SCI 512 may include a resource reservation for one or more header slots 502/602 of one or more subsequent groups of multiple slots and for at least one non-header slot of the one or more subsequent groups of multiple slots. The reception may be performed, e.g., by the reception component 1130 of the apparatus 1102 in FIG. 11.

At 912, the UE may receive one or more retransmissions of the multiple slot SCI in at least one of the first slot of the group of multiple slots or a header slot of one or more subsequent groups of multiple slots. For example, referring to FIGS. 4-6B, the second UE 404 may receive, at 418, retransmissions of the multiple slot SCI based on N>3. The first slot may include a header slot (e.g., 502/602), and a retransmission of the multiple slot SCI 512-514 may be received in at least one of the first slot of the group of multiple slots (e.g., 502/602) or the header slot (e.g., 603) of one or more subsequent groups of multiple slots. The header slot 502 may include a format comprising control resources for the multiple slot SCI 512-514 and not data resources. The reception may be performed, e.g., by the reception component 1130 of the apparatus 1102 in FIG. 11.

At 914, the UE may update a set of candidate resources for sidelink transmission based on excluding the reserved resources for the group of multiple slots. For example, referring to FIG. 4, the second UE 404 may update, at 420, candidate resources for sidelink transmission of the second UE 404 based on resources reserved by the first UE 402. The updating may be performed, e.g., by the updater component 1146 of the apparatus 1102 in FIG. 11.

At 916, the UE may receive one or more sidelink transmissions in the reserved resources for the group of multiple slots. For example, referring to FIG. 4, the second UE 404 may receive, at 422, sidelink communication(s) via reserved resources associated with the multiple slot group. The reception may be performed, e.g., by the reception component 1130 of the apparatus 1102 in FIG. 11.

At 918, the UE may receive additional SCI in at least one slot of the group of multiple slots—the additional SCI has a different SCI format from a multiple slot SCI format received in the first slot of the group of multiple slots. For example, referring to FIGS. 4-5A, the second UE 404 may receive, at 424, additional SCI with a different format than the multiple slot SCI. In the diagram 500, the slot format 530 for the one or more additional slots 504 comprises a different slot format than the multiple slot SCI formats 520*a*-520*b*. The reception may be performed, e.g., by the reception component 1130 of the apparatus 1102 in FIG. 11.

At 920, the UE may receive subsequent multiple slot SCI reserving additional resources for a subsequent group of multiple slots. For example, referring to FIG. 4, the second UE 404 may receive, at 426, subsequent multiple slot SCI for subsequent multiple slot groups. In the diagram 600, the subsequent header slot 603 may reserve subsequent additional resources 605 of a subsequent group of multiple slots. The multiple slot SCI 512-514 may further indicate a future slot for transmission of a subsequent multiple slot SCI (e.g., included in subsequent header slot 603) corresponding to a subsequent group of multiple slots. The reception may be performed, e.g., by the reception component 1130 of the apparatus 1102 in FIG. 11.

Figure 10:
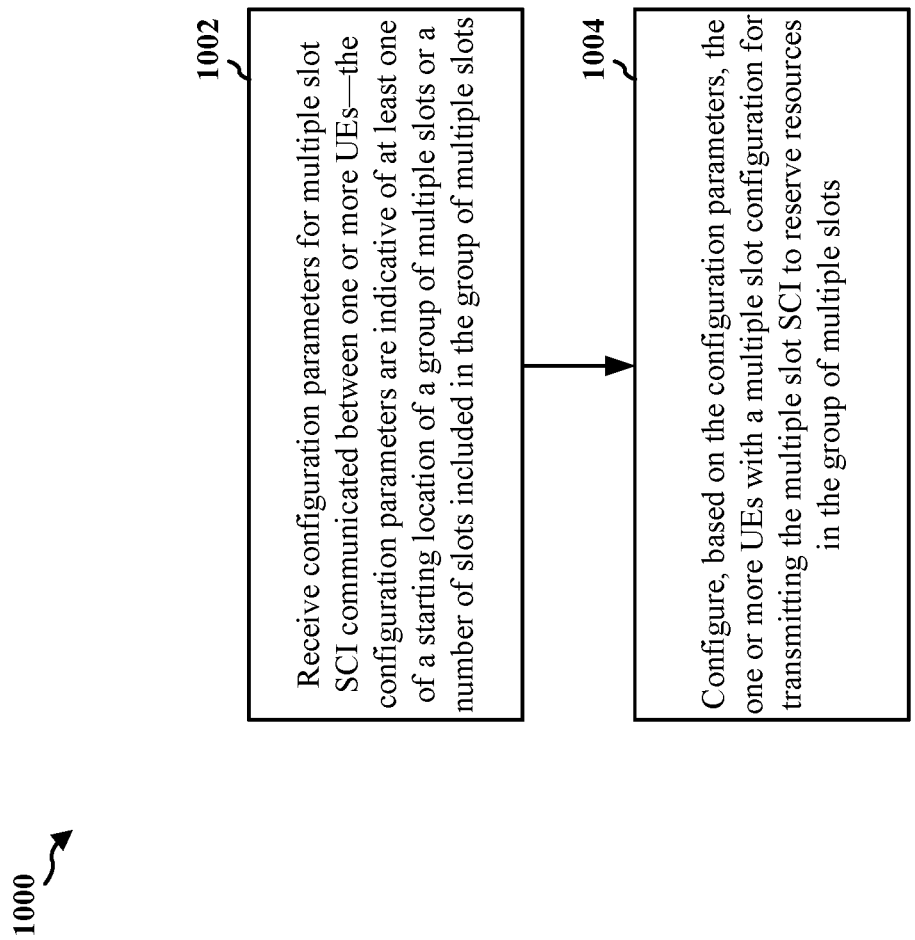
FIG. 10 is a flowchart of a method of wireless communication at a base station.

FIG. 10 is a flowchart 1000 of a method of wireless communication. The method may be performed by a base station, e.g., the base station 102/406, which may include the memory 376 and which may be the entire base station 102/406 or a component of the base station 102/406, such as the TX processor 316, the RX processor 370, and/or the controller/processor 375. One or more of the aspects illustrated in FIG. 10 may be optional. Various implementations may include a method with any combination of the aspects described in connection with FIG. 10. The method may enable the base station 102/406 to configure multiple slot SCI transmissions/receptions.

At 1002, the base station may receive configuration parameters for multiple slot SCI communicated between one or more UEs—the configuration parameters are indicative of at least one of a starting location of a group of multiple slots or a number of slots included in the group of multiple slots. For example, referring to FIG. 4, the base station 406 may receive, at 408, configuration parameters for multiple slot SCI. The reception may be performed, e.g., by the reception component 1230 of the apparatus 1202 in FIG. 12.

At 1004, the base station may configure, based on the configuration parameters, the one or more UEs with a multiple slot configuration for transmitting the multiple slot SCI to reserve resources in the group of multiple slots. For example, referring to FIG. 4, the base station 406 may configure the first UE 402, at 410*a*, and configure the second UE 404, at 410*b*, with a multiple slot SCI configuration. The multiple slot configuration, at 410*a*-410*b*, may be configured to align at least one of a header slot or a multiple slot duration for the group of multiple slots. The multiple slot configuration, at 410*a*-410*b*, may be based on a set of multiple slot configurations. The configuration may be performed, e.g., by the configuration component 1240 of the apparatus 1202 in FIG. 12.

Figure 11:
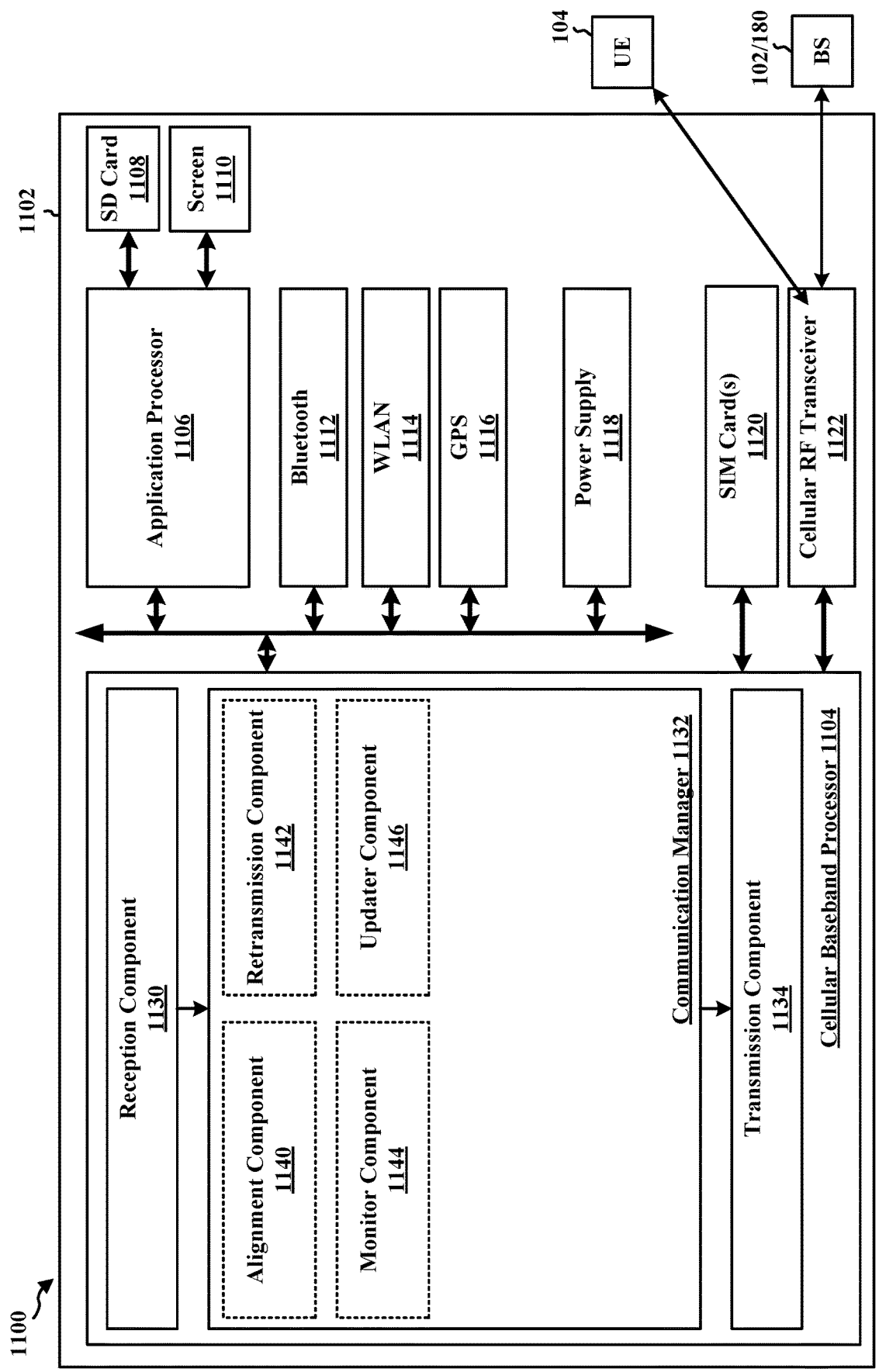
FIG. 11 is a diagram illustrating an example of a hardware implementation for an example apparatus.

FIG. 11 is a diagram 1100 illustrating an example of a hardware implementation for an apparatus 1102. The apparatus 1102 may be a UE, a component of a UE, or another device configured to transmit and/or receive sidelink communication. The apparatus 1102 includes a baseband processor 1104 (also referred to as a modem) coupled to a RF transceiver 1122. In some aspects, the baseband processor 1104 may be a cellular baseband processor and/or the RF transceiver 1122 may be a cellular RF transceiver. The apparatus 1102 may further include one or more subscriber identity modules (SIM) cards 1120, an application processor 1106 coupled to a secure digital (SD) card 1108 and a screen 1110, a Bluetooth module 1112, a wireless local area network (WLAN) module 1114, a Global Positioning System (GPS) module 1116, and/or a power supply 1118. The baseband processor 1104 communicates through the RF transceiver 1122 with the UE 104 and/or BS 102/180. The baseband processor 1104 may include a computer-readable medium/memory. The computer-readable medium/memory may be non-transitory. The baseband processor 1104 is responsible for general processing, including the execution of software stored on the computer-readable medium/memory. The software, when executed by the baseband processor 1104, causes the baseband processor 1104 to perform the various functions described in the present application. The computer-readable medium/memory may also be used for storing data that is manipulated by the baseband processor 1104 when executing software. The baseband processor 1104 further includes a reception component 1130, a communication manager 1132, and a transmission component 1134. The communication manager 1132 includes the one or more illustrated components. The components within the communication manager 1132 may be stored in the computer-readable medium/memory and/or configured as hardware within the baseband processor 1104. The baseband processor 1104 may be a component of the device 350 and may include the memory 360 and/or at least one of the TX processor 368, the RX processor 356, and the controller/processor 359. In one configuration, the apparatus 1102 may be a modem chip and include just the baseband processor 1104, and in another configuration, the apparatus 1102 may be the entire UE (e.g., see 350 of FIG. 3) and include the additional modules of the apparatus 1102.

The reception component 1130 is configured, e.g., as described in connection with 802, to receive, from a base station, a configuration indicative of at least one of a starting location or a number of slots associated with a group of multiple slots. In further aspects, the reception component 1130 is configured, e.g., as described in connection with 902, 910, 912, 916, 918, and 920, to receive, from a base station, a configuration indicative of at least one of a starting location or a number of slots associated with a group of multiple slots; to receive the multiple slot SCI in a first slot of a group of multiple slots—the multiple slot SCI reserves resources for the group of multiple slots; to receive one or more retransmissions of the multiple slot SCI in at least one of the first slot of the group of multiple slots or a header slot of one or more subsequent groups of multiple slots; to receive one or more sidelink transmissions in the reserved resources for the group of multiple slots; to receive additional SCI in at least one slot of the group of multiple slots—the additional SCI has a different SCI format from the multiple slot SCI format received in the first slot of the group of multiple slots; and to receive subsequent multiple slot SCI reserving additional resources for a subsequent group of multiple slots.

The communication manager 1132 includes an alignment component 1140 that is configured, e.g., as described in connection with 804, to align, based on the configuration, a first slot of the group of multiple slots with corresponding slots associated with at least one other UE. The communication manager 1132 further includes a retransmission component 1142 that is configured, e.g., as described in connection with 808, to retransmit the multiple slot SCI based on a number of retransmissions (N) (e.g., N>3). The communication manager 1132 further includes a monitor component 1144 that is configured, e.g., as described in connection with 904, 906, and 908, to monitor for multiple slot SCI based on the configuration; to monitor for incoming multiple slot SCI in each slot; and to monitor for incoming multiple slot SCI in a subset of slots based on a set of multiple slot SCI configurations. The communication manager 1132 further includes an updater component 1146 that is configured, e.g., as described in connection with 914, to update a set of candidate resources for sidelink transmission based on excluding the reserved resources for the group of multiple slots.

The transmission component 1134 is configured, e.g., as described in connection with 806, 810, 812, and 814, to transmit the multiple slot SCI in the first slot of the group of multiple slots—the multiple slot SCI reserving resources for the group of multiple slots; to transmit one or more sidelink transmissions in the reserved resources for the group of multiple slots; to transmit additional SCI in at least one slot of the group of multiple slots—the additional SCI has a different SCI format from a multiple slot SCI format transmitted in the first slot of the group of multiple slots; and to transmit subsequent multiple slot SCI reserving additional resources for a subsequent group of multiple slots.

The apparatus may include additional components that perform each of the blocks of the algorithm in the flowcharts of FIGS. 8-9. As such, each block in the flowcharts of FIGS. 8-9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1102, and in particular the baseband processor 1104, includes means for transmitting a multiple slot SCI in a first slot of a group of multiple slots, the multiple slot SCI reserving resources for the group of multiple slots; and means for transmitting one or more sidelink transmissions in the reserved resources for the group of multiple slots. The apparatus 1102 further includes means for transmitting additional SCI in at least one slot of the group of multiple slots, the additional SCI having a different SCI format from the multiple slot SCI format transmitted in the first slot of the group of multiple slots. The apparatus 1102 further includes means for retransmitting the multiple slot SCI based on a number of retransmissions (N), where N>3. The apparatus 1102 further includes means for transmitting the subsequent multiple slot SCI reserving additional resources for the subsequent group of multiple slots. The apparatus 1102 further includes means for receiving, from a base station, a configuration indicative of at least one of a starting location or a number of slots associated with the group of multiple slots. The apparatus 1102 further includes means for aligning, based on the configuration, the first slot with corresponding slots associated with at least one other UE.

In a further configuration, the apparatus 1102, and in particular the baseband processor 1104, includes means for receiving a multiple slot SCI in a first slot of a group of multiple slots, the multiple slot SCI reserving resources for the group of multiple slots; and means for receiving one or more sidelink transmissions in the reserved resources for the group of multiple slots. The apparatus 1102 further includes means for updating a set of candidate resources for sidelink transmission based on excluding the reserved resources for the group of multiple slots. The apparatus 1102 further includes means for receiving additional SCI in at least one slot of the group of multiple slots, the additional SCI having a different SCI format from the multiple slot SCI format received in the first slot of the group of multiple slots. The apparatus 1102 further includes means for receiving one or more retransmissions of the multiple slot SCI, wherein the first slot comprises a header slot, and the one or more retransmissions of the multiple slot SCI are received in at least one of the first slot of the group of multiple slots or the header slot of one or more subsequent groups of multiple slots. The apparatus 1102 further includes means for receiving the subsequent multiple slot SCI reserving additional resources for the subsequent group of multiple slots. The apparatus 1102 further includes means for receiving, from a base station, a configuration indicative of at least one of a starting location or a number of slots associated with the group of multiple slots; and means for monitoring for the multiple slot SCI based on the configuration. The apparatus 1102 further includes means for monitoring for incoming multiple slot SCI in each slot. The apparatus 1102 further includes means for monitoring for incoming multiple slot SCI in a subset of slots based on a set of multiple slot SCI configurations.

The means may be one or more of the components of the apparatus 1102 configured to perform the functions recited by the means. As described herein, the apparatus 1102 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 12:
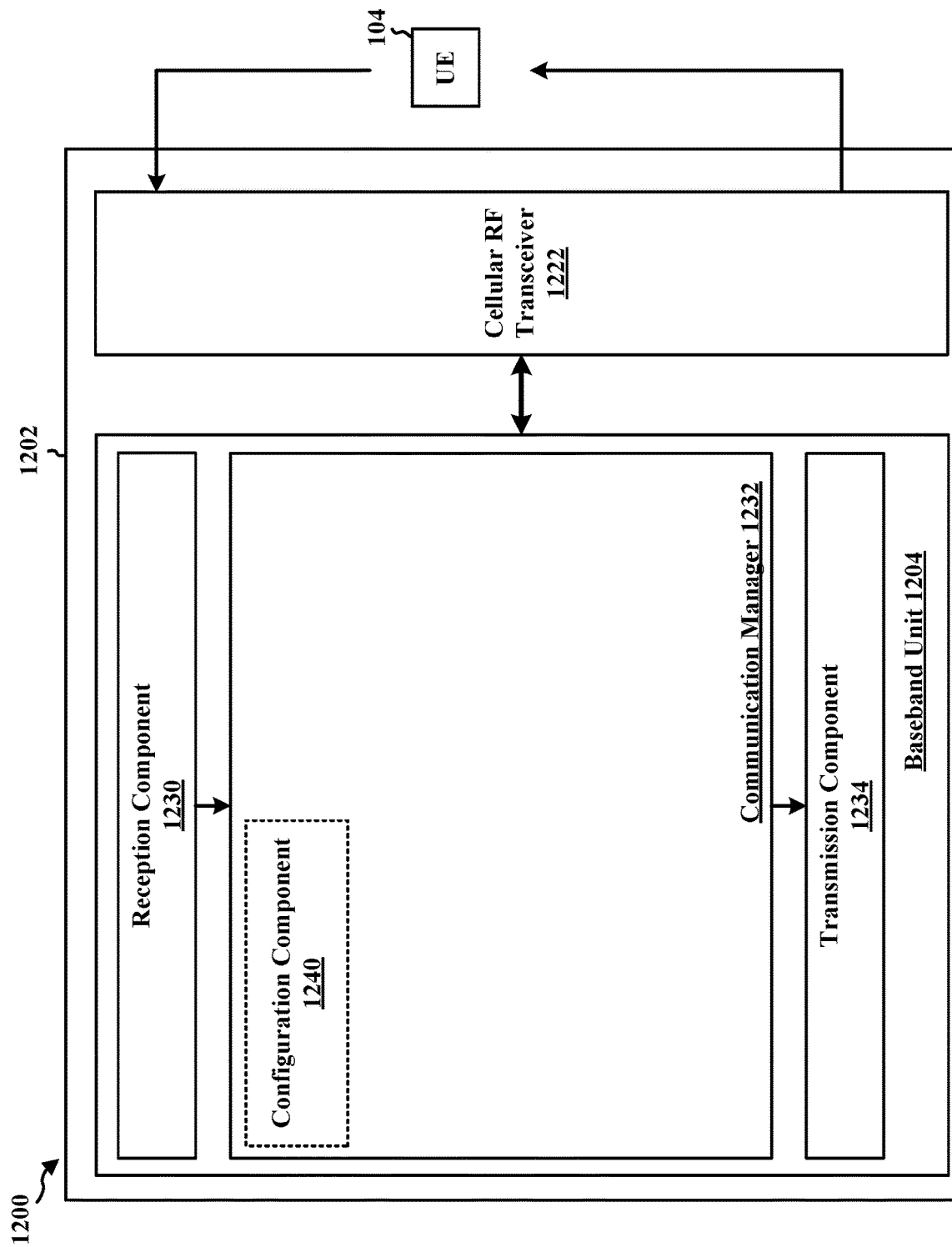
FIG. 12 is a diagram illustrating an example of a hardware implementation for an example apparatus.

FIG. 12 is a diagram 1200 illustrating an example of a hardware implementation for an apparatus 1202. The apparatus 1202 is a BS and includes a baseband unit 1204. The baseband unit 1204 may communicate through a cellular RF transceiver 1222 with the UE 104. The baseband unit 1204 may include a computer-readable medium/memory. The baseband unit 1204 is responsible for general processing, including the execution of software stored on the computer-readable medium/memory. The software, when executed by the baseband unit 1204, causes the baseband unit 1204 to perform the various functions described supra. The computer-readable medium/memory may also be used for storing data that is manipulated by the baseband unit 1204 when executing software. The baseband unit 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the baseband unit 1204. The baseband unit 1204 may be a component of the BS 310 and may include the memory 376 and/or at least one of the TX processor 316, the RX processor 370, and the controller/processor 375.

The reception component 1230 is configured, e.g., as described in connection with 1002, to receive configuration parameters for multiple slot SCI communicated between one or more UEs—the configuration parameters are indicative of at least one of a starting location of a group of multiple slots or a number of slots included in the group of multiple slots. The communication manager 1232 includes a configuration component 1240 that is configured, e.g., as described in connection with 1004, to configure, based on the configuration parameters, the one or more UEs with a multiple slot configuration for transmitting the multiple slot SCI to reserve resources in the group of multiple slots.

The apparatus may include additional components that perform each of the blocks of the algorithm in the aforementioned flowchart of FIG. 10. As such, each block in the aforementioned flowchart of FIG. 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1202, and in particular the baseband unit 1204, includes means for receiving configuration parameters for multiple slot SCI communicated between one or more UEs, the configuration parameters indicative of at least one of a starting location of a group of multiple slots or a number of slots included in the group of multiple slots; and means for configuring, based on the configuration parameters, the one or more UEs with a multiple slot configuration for transmitting the multiple slot SCI to reserve resources in the group of multiple slots. The aforementioned means may be one or more of the aforementioned components of the apparatus 1202 configured to perform the functions recited by the aforementioned means. As described supra, the apparatus 1202 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with aspects of other examples or teachings described herein, without limitation.

Aspect 1 is a method of wireless communication at a first UE, comprising: transmitting a multiple slot SCI in a first slot of a group of multiple slots, the multiple slot SCI reserving resources for the group of multiple slots; and transmitting one or more sidelink transmissions in the reserved resources for the group of multiple slots.

Aspect 2 may be combined with aspect 1 and further includes transmitting additional SCI in at least one slot of the group of multiple slots, the additional SCI having a different SCI format from a multiple slot SCI format transmitted in the first slot of the group of multiple slots.

Aspect 3 may be combined with any of aspects 1-2 and includes that each group of multiple slots includes one header slot for the multiple slot SCI and at least one non-header slot for additional SCI.

Aspect 4 may be combined with any of aspects 1-3 and includes that a header slot format includes control resources and not data resources, and at least one non-header slot format includes the control resources and the data resources.

Aspect 5 may be combined with any of aspects 1-4 and includes that a format of the first slot includes control resources for the multiple slot SCI and additional resources for at least one of SCI-1 for a single slot, SCI-2 for the single slot, or a PSSCH.

Aspect 6 may be combined with any of aspects 1-5 and includes that the multiple slot SCI includes at least one of the SCI-1 or the SCI-2 for the resources in the group of multiple slots.

Aspect 7 may be combined with any of aspects 1-6 and includes that a format of the first slot includes control resources for the multiple slot SCI and not for a single slot SCI or data.

Aspect 8 may be combined with any of aspects 1-7 and further includes retransmitting the multiple slot SCI based on a number of retransmissions (N), where N>3.

Aspect 9 may be combined with any of aspects 1-8 and includes that the first slot comprises a header slot, and a retransmission of the multiple slot SCI occurs in at least one of the first slot of the group of multiple slots or the header slot of one or more subsequent groups of multiple slots.

Aspect 10 may be combined with any of aspects 1-9 and includes that the header slot has a format comprising control resources for the multiple slot SCI and not data resources.

Aspect 11 may be combined with any of aspects 1-10 and includes that the multiple slot SCI includes a resource reservation for one or more header slots of one or more subsequent groups of multiple slots and for at least one non-header slot of the one or more subsequent groups of multiple slots.

Aspect 12 may be combined with any of aspects 1-11 and includes that the multiple slot SCI further indicates a future slot for transmission of a subsequent multiple slot SCI corresponding to a subsequent group of multiple slots.

Aspect 13 may be combined with any of aspects 1-12 and further includes transmitting the subsequent multiple slot SCI reserving additional resources for the subsequent group of multiple slots.

Aspect 14 may be combined with any of aspects 1-13 and further includes receiving, from a base station, a configuration indicative of at least one of a starting location or a number of slots associated with the group of multiple slots.

Aspect 15 may be combined with any of aspects 1-14 and further includes aligning, based on the configuration, the first slot and with corresponding slots associated with at least one other UE.

Aspect 16 is a method of wireless communication at a second UE, comprising: receiving a multiple slot SCI in a first slot of a group of multiple slots, the multiple slot SCI reserving resources for the group of multiple slots; and receiving one or more sidelink transmissions in the reserved resources for the group of multiple slots by the multiple slot SCI.

Aspect 17 may be combined with aspect 16 and further includes updating a set of candidate resources for sidelink transmission based on excluding the reserved resources for the group of multiple slots.

Aspect 18 may be combined with any of aspects 16-17 and further includes receiving additional SCI in at least one slot of the group of multiple slots, the additional SCI having a different SCI format from a multiple slot SCI format received in the first slot of the group of multiple slots.

Aspect 19 may be combined with any of aspects 16-18 and includes that each group of multiple slots includes one header slot for the multiple slot SCI and at least one non-header slot for additional SCI.

Aspect 20 may be combined with any of aspects 16-19 and includes that a header slot format includes control resources and not data resources, and a non-header slot format includes the control resources and the data resources.

Aspect 21 may be combined with any of aspects 16-20 and includes that a format of the first slot includes resources for the multiple slot SCI and at least one of SCI-1 for a single slot, SCI-2 for a single slot, or a PSSCH.

Aspect 22 may be combined with any of aspects 16-21 and includes that the multiple slot SCI includes at least one of SCI-1 or SCI-2 for the resources in the group of multiple slots.

Aspect 23 may be combined with any of aspects 16-22 and includes that a format of the first slot includes resources for the multiple slot SCI and not for a single slot SCI or data.

Aspect 24 may be combined with any of aspects 16-23 and further includes receiving one or more retransmissions of the multiple slot SCI, wherein the first slot comprises a header slot, and the one or more retransmissions of the multiple slot SCI are received in at least one of the first slot of the group of multiple slots or the header slot of one or more subsequent groups of multiple slots.

Aspect 25 may be combined with any of aspects 16-24 and includes that the header slot has a format comprising control resources for the multiple slot SCI and not data resources.

Aspect 26 may be combined with any of aspects 16-25 and includes that the multiple slot SCI includes a resource reservation for one or more header slots of one or more subsequent groups of multiple slots and for at least one non-header slot of the one or more subsequent groups of multiple slots.

Aspect 27 may be combined with any of aspects 16-26 and includes that the multiple slot SCI further indicates a future slot for transmission of a subsequent multiple slot SCI corresponding to a subsequent group of multiple slots.

Aspect 28 may be combined with any of aspects 16-27 and further includes receiving the subsequent multiple slot SCI reserving additional resources for the subsequent group of multiple slots.

Aspect 29 may be combined with any of aspects 16-28 and further includes receiving, from a base station, a configuration indicative of at least one of a starting location or a number of slots associated with the group of multiple slots; and monitoring for the multiple slot SCI based on the configuration.

Aspect 30 may be combined with any of aspects 16-29 and further includes monitoring for incoming multiple slot SCI in each slot.

Aspect 31 may be combined with any of aspects 16-29 and further includes monitoring for incoming multiple slot SCI in a subset of slots based on a set of multiple slot SCI configurations.

Aspect 32 is a method of wireless communication at a base station, comprising: receiving configuration parameters for multiple slot SCI communicated between one or more UEs, the configuration parameters indicative of at least one of a starting location of a group of multiple slots or a number of slots included in the group of multiple slots; and configuring, based on the configuration parameters, the one or more UEs with a multiple slot configuration for transmitting the multiple slot SCI to reserve resources in the group of multiple slots.

Aspect 33 may be combined with aspect 32 and includes that the multiple slot configuration aligns at least one of a header slot or a multiple slot duration for the group of multiple slots.

Aspect 34 may be combined with any of aspects 32-33 and includes that the multiple slot configuration is based on a set of multiple slot configurations.

Aspect 35 is an apparatus for wireless communication including at least one processor coupled to a memory and configured to implement a method as in any of aspects 1-34.

Aspect 36 is an apparatus for wireless communication including means for implementing a method as in any of aspects 1-34.

Aspect 37 is a non-transitory computer-readable storage medium storing computer executable code, the code when executed by at least one processor causes the at least one processor to implement a method as in any of aspects 1-34.

What is claimed is:

1. An apparatus for wireless communication at a first user equipment (UE), comprising:
   memory; and
   one or more processors coupled to the memory, the one or more processors configured to cause the first UE to:
   transmit a multiple slot sidelink control information (SCI) in a first slot of a group of multiple slots, the multiple slot SCI reserving resources for the group of multiple slots, wherein the multiple slot SCI reserves a first amount of resources that is greater than a second amount of resources reserved by first stage SCI (SCI-1) and second stage SCI (SCI-2); and
   transmit one or more sidelink transmissions in the reserved resources for the group of multiple slots.

2. The apparatus of claim 1, wherein the one or more processors are further configured to cause the first UE to transmit additional SCI in at least one slot of the group of multiple slots, the additional SCI having a different SCI format from a multiple slot SCI format transmitted in the first slot of the group of multiple slots.

3. The apparatus of claim 1, wherein the group of multiple slots includes one header slot for the multiple slot SCI and at least one non-header slot for additional SCI.

4. The apparatus of claim 3, wherein a header slot format includes control resources and not data resources, and at least one non-header slot format includes the control resources and the data resources.

5. The apparatus of claim 1, wherein a format of the first slot includes control resources for the multiple slot SCI and additional resources for at least one of the SCI-1 for a single slot, the SCI-2 for the single slot, or a physical sidelink shared channel (PSSCH).

6. The apparatus of claim 5, wherein a format of the multiple slot SCI includes at least one of the SCI-1 or the SCI-2 for the resources in the group of multiple slots.

7. The apparatus of claim 1, wherein a format of the first slot includes control resources for the multiple slot SCI and not for a single slot SCI or data.

8. The apparatus of claim 1, wherein the one or more processors are further configured to cause the first UE to retransmit the multiple slot SCI based on a number of retransmissions (N), where N>3.

9. The apparatus of claim 8, wherein the first slot comprises a header slot, and a retransmission of the multiple slot SCI occurs in at least one of the first slot of the group of multiple slots or the header slot of one or more subsequent groups of multiple slots.

10. The apparatus of claim 9, wherein the header slot has a format comprising control resources for the multiple slot SCI and not data resources.

11. The apparatus of claim 1, wherein the multiple slot SCI includes a resource reservation for one or more header slots of one or more subsequent groups of multiple slots and for at least one non-header slot of the one or more subsequent groups of multiple slots.

12. The apparatus of claim 1, wherein the multiple slot SCI further indicates a future slot for transmission of a subsequent multiple slot SCI corresponding to a subsequent group of multiple slots.

13. The apparatus of claim 12, wherein the one or more processors are further configured to cause the first UE to transmit the subsequent multiple slot SCI reserving additional resources for the subsequent group of multiple slots.

14. The apparatus of claim 1, wherein the one or more processors are further configured to cause the first UE to receive a configuration indicative of at least one of a starting location or a number of slots associated with the group of multiple slots.

15. The apparatus of claim 14, wherein the one or more processors are further configured to cause the first UE to align, based on the configuration, the first slot and with corresponding slots associated with at least one other UE.

16. The apparatus of claim 1, wherein the one or more processors are further configured to cause the first UE to:
   transmit the SCI-1 in the first slot, wherein the SCI-1 points to a second slot in the group of multiple slots, and wherein the multiple slot SCI points to a subsequent group of multiple slots.

17. An apparatus for wireless communication at a second user equipment (UE), comprising:
   memory; and
   one or more processors coupled to the memory, the one or more processors configured to cause the second UE to:
   receive a multiple slot sidelink control information (SCI) in a first slot of a group of multiple slots, the multiple slot SCI reserving resources for the group of multiple slots, wherein the multiple slot SCI reserves a first amount of resources that is greater than a second amount of resources reserved by first stage SCI (SCI-1) and second stage SCI (SCI-2); and
   receive one or more sidelink transmissions in the reserved resources for the group of multiple slots.

18. The apparatus of claim 17, wherein the one or more processors are further configured to cause the second UE to update a set of candidate resources for sidelink transmission based on excluding the reserved resources for the group of multiple slots.

19. The apparatus of claim 17, wherein the one or more processors are further configured to cause the second UE to receive additional SCI in at least one slot of the group of multiple slots, the additional SCI having a different SCI format from a multiple slot SCI format received in the first slot of the group of multiple slots.

20. The apparatus of claim 17, wherein the group of multiple slots includes one header slot for the multiple slot SCI and at least one non-header slot for additional SCI.

21. The apparatus of claim 20, wherein a header slot format includes control resources and not data resources, and a non-header slot format includes the control resources and the data resources.

22. The apparatus of claim 17, wherein the one or more processors are further configured to cause the second UE to receive one or more retransmissions of the multiple slot SCI, wherein the first slot comprises a header slot, and the one or more retransmissions of the multiple slot SCI are received in at least one of the first slot of the group of multiple slots or the header slot of one or more subsequent groups of multiple slots.

23. The apparatus of claim 17, wherein the multiple slot SCI includes a resource reservation for one or more header slots of one or more subsequent groups of multiple slots and for at least one non-header slot of the one or more subsequent groups of multiple slots.

24. The apparatus of claim 17, wherein the multiple slot SCI further indicates a future slot for transmission of a subsequent multiple slot SCI corresponding to a subsequent group of multiple slots.

25. The apparatus of claim 24, wherein the one or more processors are further configured to cause the second UE to receive the subsequent multiple slot SCI reserving additional resources for the subsequent group of multiple slots.

26. The apparatus of claim 17, wherein the one or more processors are further configured to cause the second UE to:
receive a configuration indicative of at least one of a starting location or a number of slots associated with the group of multiple slots; and
monitor for the multiple slot SCI based on the configuration.

27. The apparatus of claim 17, wherein the one or more processors are further configured to cause the second UE to monitor for incoming multiple slot SCI in each slot.

28. The apparatus of claim 17, wherein the one or more processors are further configured to cause the second UE to monitor for incoming multiple slot SCI in a subset of slots based on a set of multiple slot SCI configurations.

29. The apparatus of claim 17, wherein the one or more processors are further configured to cause the second UE to:
receive the SCI-1 in the first slot, wherein the SCI-1 points to a second slot in the group of multiple slots, and wherein the multiple slot SCI points to a subsequent group of multiple slots.

30. An apparatus for wireless communication at a network entity, comprising:
a memory; and
one or more processors coupled to the memory, the one or more processors configured to cause the network entity to:
receive configuration parameters for multiple slot sidelink control information (SCI) communicated between a first user equipment (UE) and a second UE, the configuration parameters indicative of at least one of a starting location of a group of multiple slots or a number of slots included in the group of multiple slots, wherein the multiple slot SCI reserves a first amount of resources that is greater than a second amount of resources reserved by first stage SCI (SCI-1) and second stage SCI (SCI-2); and
configure, based on the configuration parameters, at least one of the first UE or the second UE with a multiple slot configuration for transmission of the multiple slot SCI to reserve resources in the group of multiple slots.

31. The apparatus of claim 30, wherein the multiple slot configuration aligns at least one of a header slot or a multiple slot duration for the group of multiple slots.

32. The apparatus of claim 30, wherein the multiple slot configuration is based on a set of multiple slot configurations.

33. A method of wireless communication at a first user equipment (UE), comprising:
transmitting a multiple slot sidelink control information (SCI) in a first slot of a group of multiple slots, the multiple slot SCI reserving resources for the group of multiple slots, wherein the multiple slot SCI reserves a first amount of resources that is greater than a second amount of resources reserved by first stage SCI (SCI-1) and second stage SCI (SCI-2); and
transmitting one or more sidelink transmissions in the reserved resources for the group of multiple slots.

34. The method of claim 33, further comprising:
transmitting additional SCI in at least one slot of the group of multiple slots, the additional SCI having a different SCI format from a multiple slot SCI format transmitted in the first slot of the group of multiple slots.

35. The method of claim 33, wherein the group of multiple slots includes one header slot for the multiple slot SCI and at least one non-header slot for additional SCI.

36. The method of claim 33, further comprising:
retransmitting the multiple slot SCI based on a number of retransmissions (N), where N>3.

37. The method of claim 33, wherein the multiple slot SCI includes a resource reservation for one or more header slots of one or more subsequent groups of multiple slots and for at least one non-header slot of the one or more subsequent groups of multiple slots.

38. The method of claim 33, wherein the multiple slot SCI further indicates a future slot for transmission of a subsequent multiple slot SCI corresponding to a subsequent group of multiple slots.

39. The method of claim 33, further comprising:
transmitting the SCI-1 in the first slot, wherein the SCI-1 points to a second slot in the group of multiple slots, and wherein the multiple slot SCI points to a subsequent group of multiple slots.

40. A method of wireless communication at a second user equipment (UE), comprising:
receiving a multiple slot sidelink control information (SCI) in a first slot of a group of multiple slots, the multiple slot SCI reserving resources for the group of multiple slots, wherein the multiple slot SCI reserves a first amount of resources that is greater than a second amount of resources reserved by first stage SCI (SCI-1) and second stage SCI (SCI-2); and
receiving one or more sidelink transmissions in the reserved resources for the group of multiple slots.

41. The method of claim 40, further comprising:
receiving additional SCI in at least one slot of the group of multiple slots, the additional SCI having a different SCI format from a multiple slot SCI format received in the first slot of the group of multiple slots.

42. The method of claim 40, wherein the group of multiple slots includes one header slot for the multiple slot SCI and at least one non-header slot for additional SCI.

43. The method of claim 40, further comprising:
receiving one or more retransmissions of the multiple slot SCI, wherein the first slot comprises a header slot, and the one or more retransmissions of the multiple slot SCI are received in at least one of the first slot of the group of multiple slots or the header slot of one or more subsequent groups of multiple slots.

44. The method of claim 40, wherein the multiple slot SCI includes a resource reservation for one or more header slots of one or more subsequent groups of multiple slots and for at least one non-header slot of the one or more subsequent groups of multiple slots.

45. The method of claim 40, wherein the multiple slot SCI further indicates a future slot for transmission of a subsequent multiple slot SCI corresponding to a subsequent group of multiple slots.

46. The method of claim 40, further comprising:
receiving the SCI-1 in the first slot, wherein the SCI-1 points to a second slot in the group of multiple slots, and wherein the multiple slot SCI points to a subsequent group of multiple slots.

47. A method of wireless communication at a network entity, comprising:
  receiving configuration parameters for multiple slot sidelink control information (SCI) communicated between a first user equipment (UE) and a second UE, the configuration parameters indicative of at least one of a starting location of a group of multiple slots or a number of slots included in the group of multiple slots, wherein the multiple slot SCI reserves a first amount of resources that is greater than a second amount of resources reserved by first stage SCI (SCI-1) and second stage SCI (SCI-2); and
  configuring, based on the configuration parameters, at least one of the first UE or the second UE with a multiple slot configuration for transmission of the multiple slot SCI to reserve resources in the group of multiple slots.

48. A non-transitory computer-readable medium storing computer executable code, the computer executable code when executed by one or more processors causes the one or more processors to cause a first user equipment (UE) to:
  transmit a multiple slot sidelink control information (SCI) in a first slot of a group of multiple slots, the multiple slot SCI reserving resources for the group of multiple slots, wherein the multiple slot SCI reserves a first amount of resources that is greater than a second amount of resources reserved by first stage SCI (SCI-1) and second stage SCI (SCI-2); and
  transmit one or more sidelink transmissions in the reserved resources for the group of multiple slots.

49. The non-transitory computer-readable medium of claim 48, wherein the code when executed by the one or more processors further causes the one or more processors to cause the first UE to:
  transmit additional SCI in at least one slot of the group of multiple slots, the additional SCI having a different SCI format from a multiple slot SCI format transmitted in the first slot of the group of multiple slots.

50. The non-transitory computer-readable medium of claim 48, wherein the group of multiple slots includes one header slot for the multiple slot SCI and at least one non-header slot for additional SCI.

51. The non-transitory computer-readable medium of claim 48, wherein the code when executed by the one or more processors further causes the one or more processors to cause the first UE to:
  retransmit the multiple slot SCI based on a number of retransmissions (N), where N>3.

52. The non-transitory computer-readable medium of claim 48, wherein the multiple slot SCI includes a resource reservation for one or more header slots of one or more subsequent groups of multiple slots and for at least one non-header slot of the one or more subsequent groups of multiple slots.

53. The non-transitory computer-readable medium of claim 48, wherein the multiple slot SCI further indicates a future slot for transmission of a subsequent multiple slot SCI corresponding to a subsequent group of multiple slots.

54. The non-transitory computer-readable medium of claim 48, wherein the code when executed by the one or more processors further causes the one or more processors to cause the first UE to:
  transmit the SCI-1 in the first slot, wherein the SCI-1 points to a second slot in the group of multiple slots, and wherein the multiple slot SCI points to a subsequent group of multiple slots.

55. A non-transitory computer-readable medium storing computer executable code, the computer executable code when executed by one or more processors causes the one or more processors to cause a second user equipment (UE) to:
  receive a multiple slot sidelink control information (SCI) in a first slot of a group of multiple slots, the multiple slot SCI reserving resources for the group of multiple slots, wherein the multiple slot SCI reserves a first amount of resources that is greater than a second amount of resources reserved by first stage SCI (SCI-1) and second stage SCI (SCI-2); and
  receive one or more sidelink transmissions in the reserved resources for the group of multiple slots.

56. The non-transitory computer-readable medium of claim 55, wherein the code when executed by the one or more processors further causes the one or more processors to cause the second UE to:
  receive additional SCI in at least one slot of the group of multiple slots, the additional SCI having a different SCI format from a multiple slot SCI format received in the first slot of the group of multiple slots.

57. The non-transitory computer-readable medium of claim 55, wherein the group of multiple slots includes one header slot for the multiple slot SCI and at least one non-header slot for additional SCI.

58. The non-transitory computer-readable medium of claim 55, wherein the code when executed by the one or more processors further causes the one or more processors to cause the second UE to:
  receive one or more retransmissions of the multiple slot SCI, wherein the first slot comprises a header slot, and the one or more retransmissions of the multiple slot SCI are received in at least one of the first slot of the group of multiple slots or the header slot of one or more subsequent groups of multiple slots.

59. The non-transitory computer-readable medium of claim 55, wherein the multiple slot SCI includes a resource reservation for one or more header slots of one or more subsequent groups of multiple slots and for at least one non-header slot of the one or more subsequent groups of multiple slots.

60. The non-transitory computer-readable medium of claim 55, wherein the multiple slot SCI further indicates a future slot for transmission of a subsequent multiple slot SCI corresponding to a subsequent group of multiple slots.

61. The non-transitory computer-readable medium of claim 55, wherein the code when executed by the one or more processors further causes the one or more processors to cause the second UE to:
  receive the SCI-1 in the first slot, wherein the SCI-1 points to a second slot in the group of multiple slots, and wherein the multiple slot SCI points to a subsequent group of multiple slots.

62. A non-transitory computer-readable medium storing computer executable code, the computer executable code when executed by one or more processors causes the one or more processors to cause a network entity to:
  receive configuration parameters for multiple slot sidelink control information (SCI) communicated between a first user equipment (UE) and a second UE, the configuration parameters indicative of at least one of a starting location of a group of multiple slots or a number of slots included in the group of multiple slots, wherein the multiple slot SCI reserves a first amount of resources that is greater than a second amount of resources reserved by first stage SCI (SCI-1) and second stage SCI (SCI-2); and configure, based on the configuration parameters, at least one of the first UE or the second UE with a multiple slot configuration for transmission of the multiple slot SCI to reserve resources in the group of multiple slots.

* * * * *